United States Patent [19]

Suzuki et al.

[11] Patent Number: 5,521,773
[45] Date of Patent: May 28, 1996

[54] METHOD OF COMPENSATING OFFTRACK IN DISK UNIT

[75] Inventors: Nobuyuki Suzuki; Syuichi Hashimoto, both of Kawasaki, Japan

[73] Assignee: Fujitsu Limited, Japan

[21] Appl. No.: 389,327

[22] Filed: Feb. 16, 1995

Related U.S. Application Data

[63] Continuation of Ser. No. 23,094, Feb. 26, 1993, Pat. No. 5,455,724.

[30] Foreign Application Priority Data

Mar. 31, 1992 [JP] Japan .................................. 4-76439
Mar. 31, 1992 [JP] Japan .................................. 4-76440

[51] Int. Cl.⁶ .................................................. G11B 5/596
[52] U.S. Cl. ........................................ 360/77.04; 360/77.05
[58] Field of Search ............................. 360/77.04, 77.05

[56] References Cited

U.S. PATENT DOCUMENTS

| | | | |
|---|---|---|---|
| 4,511,938 | 4/1985 | Betts | 360/77 |
| 4,969,059 | 11/1990 | Volz et al. | 360/78.04 |
| 4,977,470 | 12/1990 | Murayama et al. | 360/77.04 |
| 4,977,472 | 12/1990 | Volz et al. | 360/78.14 |
| 5,109,502 | 4/1992 | Sasamoto et al. | 360/77.04 |
| 5,153,787 | 10/1992 | Sidman | 360/77.05 |
| 5,166,842 | 11/1992 | Albert et al. | 360/77.04 |
| 5,184,257 | 2/1993 | Koga et al. | 360/77.05 |
| 5,185,681 | 2/1993 | Volz et al. | 360/77.05 |
| 5,208,711 | 5/1993 | Kitamura et al. | 360/77.05 X |
| 5,270,885 | 12/1993 | Satoh et al. | 360/77.04 |

FOREIGN PATENT DOCUMENTS

| | | |
|---|---|---|
| 0420693 | 4/1991 | European Pat. Off. |
| 3806775 | 9/1989 | Germany |
| 1317286 | 12/1989 | Japan |
| 4157681 | 5/1992 | Japan |

OTHER PUBLICATIONS

Kolakewski, IBM TDB "Adaptive Gain Tracking of a Sampled Servo Channel," vol. 21, No. 10, Mar. 1979, p. 4195.

*Primary Examiner*—Aristotelis Psitos
*Assistant Examiner*—James L. Habermehl
*Attorney, Agent, or Firm*—Greer, Burns & Crain, Ltd.

[57] ABSTRACT

In a disk unit including a plurality of disk media of which any one surface is a servo surface and the other surfaces are all data surfaces; a servo head and data heads arranged on the servo surface and the data surfaces; a positioning mechanism for positioning the servo head and the data heads on desired tracks; and a control unit for controlling the positioning mechanism; the control unit reading servo data from the data surfaces and updates them to find offtrack compensated data, and the head positioning operation being controlled by using the offtrack compensated data and servo information on the servo surface, an offset occurring in the disk unit is compensated by setting the servo track center of the servo head as a reference for positioning the head; writing a pair of servo data for positioning the head onto said data surface while giving a predetermined offset amount which is offset from said track center; giving a predetermined offset amount to thus read and measure the pair of servo data and using the measured value to determine a conversion coefficient; and effecting an offtrack compensation with respect to an offtrack amount detected based on the pair of servo data, by means of a value that is calibrated using the conversion coefficient. By the method, it is possible to accurately effect the offtrack compensation, shorten the time required for measuring the offtrack amount, and improve a reliability of the disk unit.

4 Claims, 32 Drawing Sheets

(EXAMPLE WHERE MAX. RANGE OF COMPENSATION IS EQUAL TO 3.0)

5,521,773

METHOD OF COMPENSATING OFFTRACK IN DISK UNIT

This is a continuation of U.S. application Ser. No. 08/023,094, filed Feb. 26, 1993, now U.S. Pat. No. 5,455,724.

BACKGROUND OF THE INVENTION

1. Field of the Invention

The present invention relates to a disk unit, more particularly, to a compensation for an offtrack occurring in various magnetic disk units using a servo surface servo system.

2. Description of the Related Art

Increasing the storage capacity of a magnetic disk unit typically requires an increase in the number of disk media arranged on a disk element, the number of heads, and track density.

When the storage media and track density are increased, a data head that is controlled ontrack on a data surface according to servo information recorded on a servo surface will easily slip off a track if the environment of the unit changes, in particular, if ambient temperature changes from low to high, or from high to low. If the data head slips off a track, no data will be read.

To prevent such data head offtrack due to an ambient temperature change, an offset (an offtrack amount) of the data head with respect to an ontrack position is found at regular intervals by reading servo information recorded on a disk surface.

When accessing a track for reading or writing data, an offset compensation operation is carried out to shift a selected data head to remove an offset.

Even if a positional deviation occurs between a servo surface and a data surface due to a change in ambient temperature, the above technique may control the data head to an ontrack position.

Conventionally, the offtrack has been compensated by writing servo information not only on the servo surface but also on the data surfaces.

However, the offtrack amount undergoes a change with time, and the amount of deviation of the data head position is not often the same as the amount of deviation of the servo head position. In such a case, the offtrack must be compensated while compensating the servo surface by reading servo information on the data surface or compensating the data surface by reading servo information on the servo surface.

Therefore, the conventional offtrack compensation requires a considerable period of time and, besides, it is difficult to precisely compensate the offtrack.

Also, the measured offtrack amount undergoes a change due to position control errors that develop in a random fashion when it is being measured. Therefore, measurement must be taken several times and must be averaged to obtain an effective result of measurement. This requires an extended period of time for measurement.

Furthermore, when offtrack compensation is performed, if a quantity of offset is large, a head may reach the vicinity of the middle between a servo track and an adjacent servo track.

In this case, it is difficult for the head to perform stable tracking. In this connection, if the measured offtrack amount takes on a value that is more than half a width of a track, it is more likely that the disk unit has a mechanical defect.

Note, the problems in the prior art will be explained later in detail in contrast with the preferred embodiments of the present invention.

SUMMARY OF THE INVENTION

An object of the present invention is to provide an offtrack compensating method by which it is possible to accurately effect the offtrack compensation, shorten the time required for measuring the offtrack amount, and improve the reliability of the disk unit.

According to a first aspect of the invention, there is provided a method of compensating an offtrack in a disk unit comprising: a plurality of disk media of which any one surface is a servo surface and the other surfaces are all data surfaces; a servo head and data heads arranged on said servo surface and said data surfaces; a positioning mechanism for positioning the servo head and the data heads on desired tracks; and a control unit for controlling said positioning mechanism; wherein said control unit reads servo data from the data surfaces and updates them to find offtrack compensated data, and the head positioning operation is controlled by using said offtrack compensated data and servo information on the servo surface, the method comprising the steps of: setting the servo track center of the servo head as a reference for positioning the head; writing a pair of servo data for positioning the head onto said data surface while giving a predetermined offset amount which is offset from said track center; giving a predetermined offset amount to read and measure the pair of servo data and using the measured value to determine a conversion coefficient; and effecting an offtrack compensation with respect to an offtrack amount detected based on the pair of servo data, by means of a value that is calibrated using the conversion coefficient.

Also, according to a second aspect of the invention, there is provided a method of compensating an offtrack in a disk unit comprising: a plurality of disk media of which any one surface is a servo surface and the other surfaces are all data surfaces; a servo head and data heads arranged on said servo surface and said data surfaces; a positioning mechanism for positioning the servo head and the data heads on desired tracks; and a control unit for controlling said positioning mechanism; wherein said control unit reads servo data from the data surfaces and updates them to find offtrack compensated data, and the head positioning operation is controlled by using said offtrack compensated data and servo information on the servo surface, the method comprising the steps of: setting an effective range with respect to an offtrack amount detected by the control unit; and effecting an offtrack compensation where the offtrack amount is within the effective range.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Throughout the description, identical references used in connection with the drawings indicate like constituent elements and thus the repetition of explanation thereof is omitted.

For better understanding of the preferred embodiments, the related prior art will first be explained with reference to FIGS. 1 to 7e.

Figure 1:
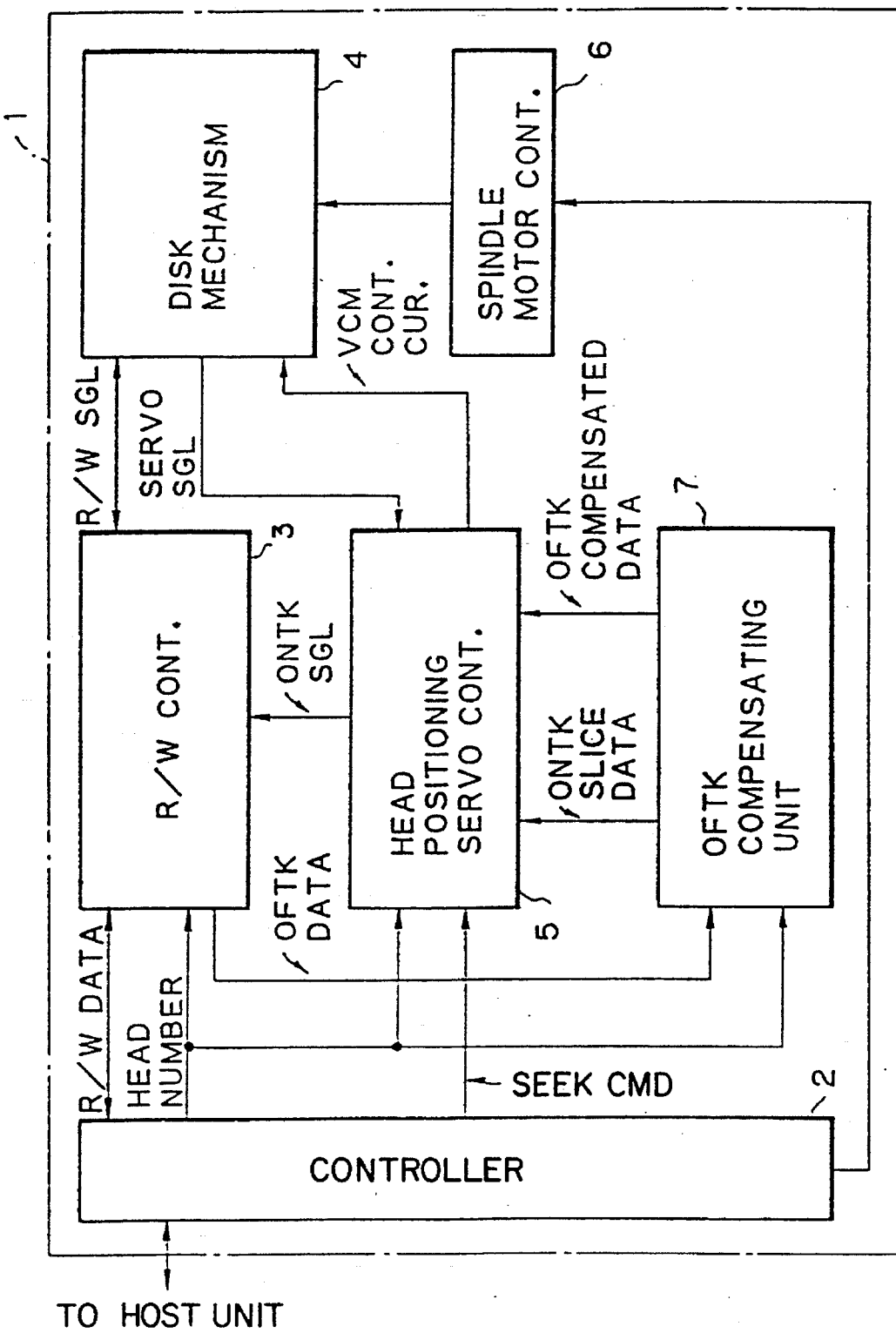
FIG. 1 is a block diagram of a conventional magnetic disk unit.
Figure 2:
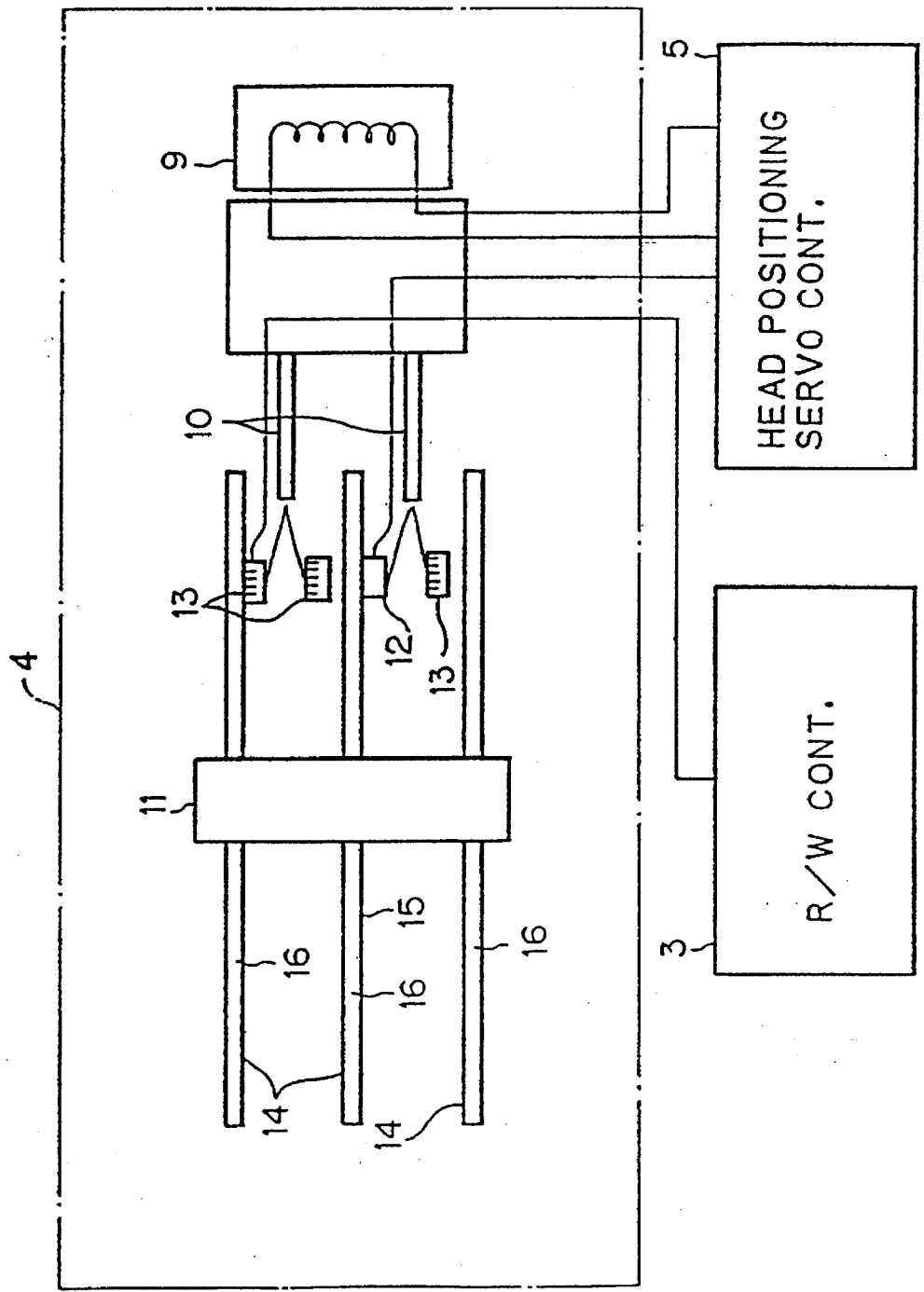
FIG. 2 is a diagram for explaining a conventional disk mechanism.
Figure 3:
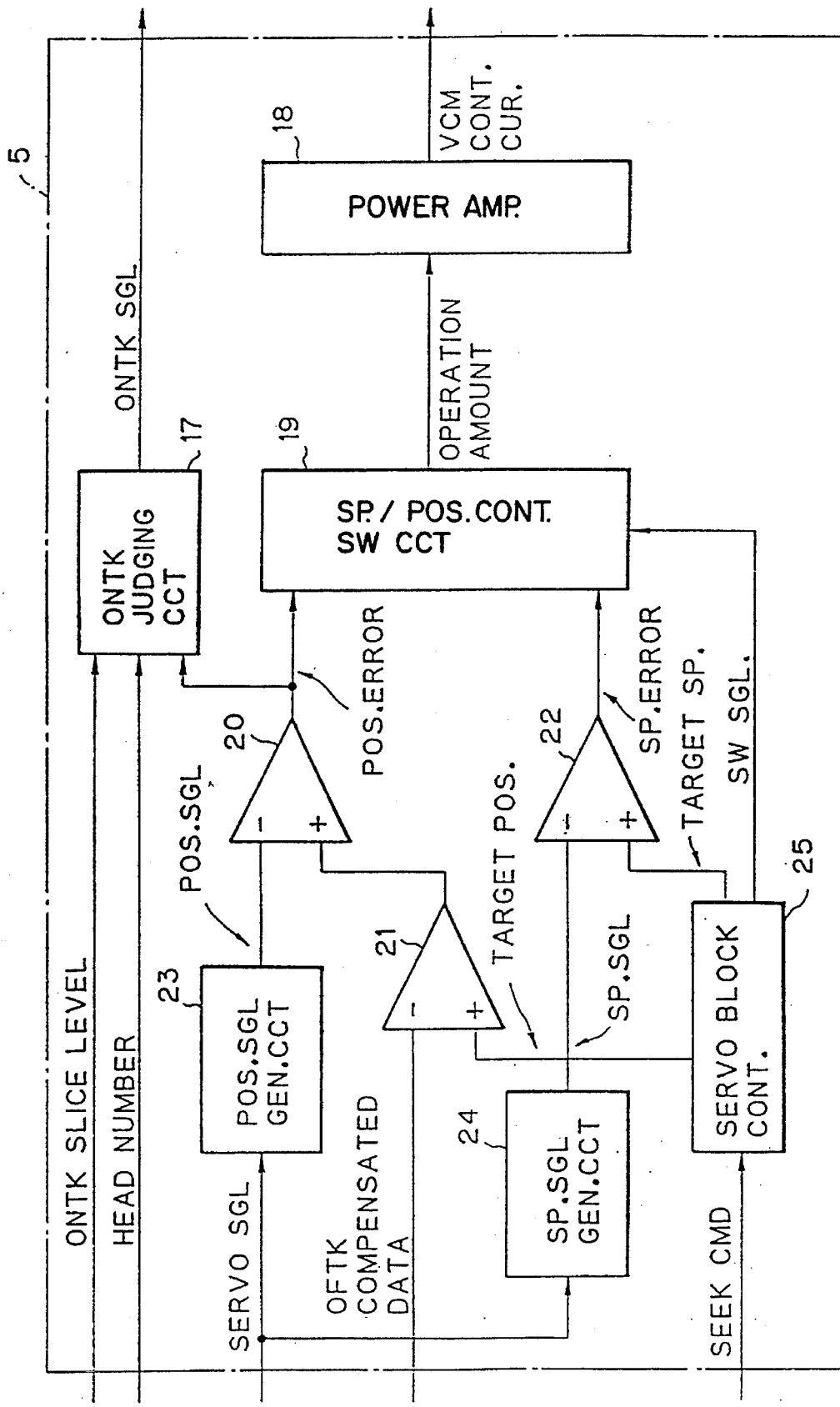
FIG. 3 is a block diagram of a conventional servo control mechanism for head positioning.
Figure 4:
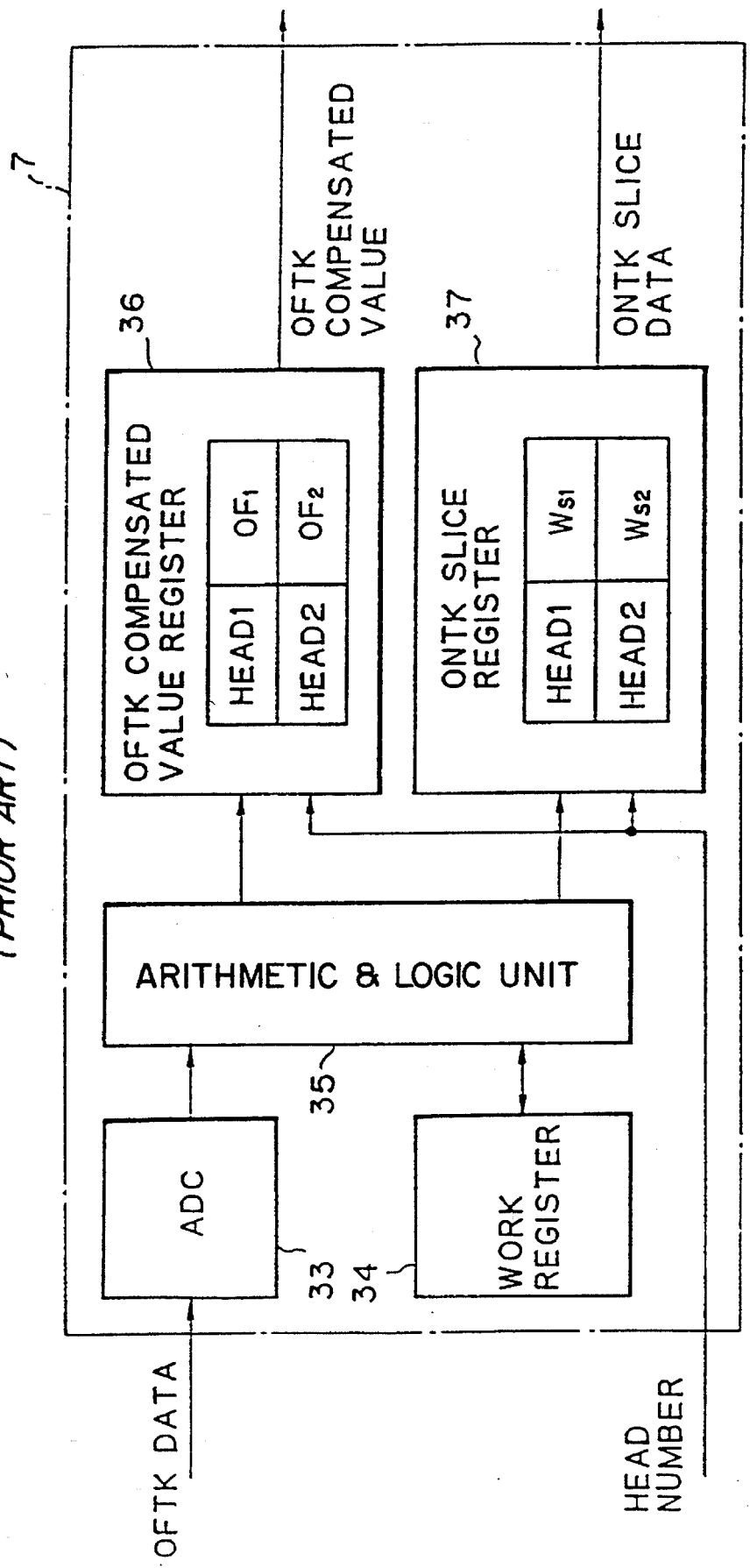
FIG. 4 is a block diagram of a conventional offtrack compensating unit.
Figure 5A:
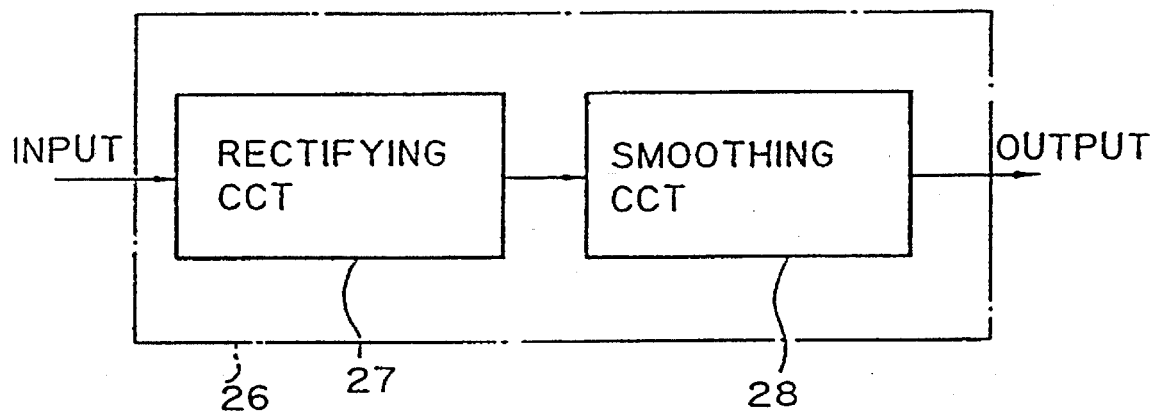
FIGS. 5a and 5b are diagrams for explaining a conventional offtrack signal generating circuit.
Figure 5B:
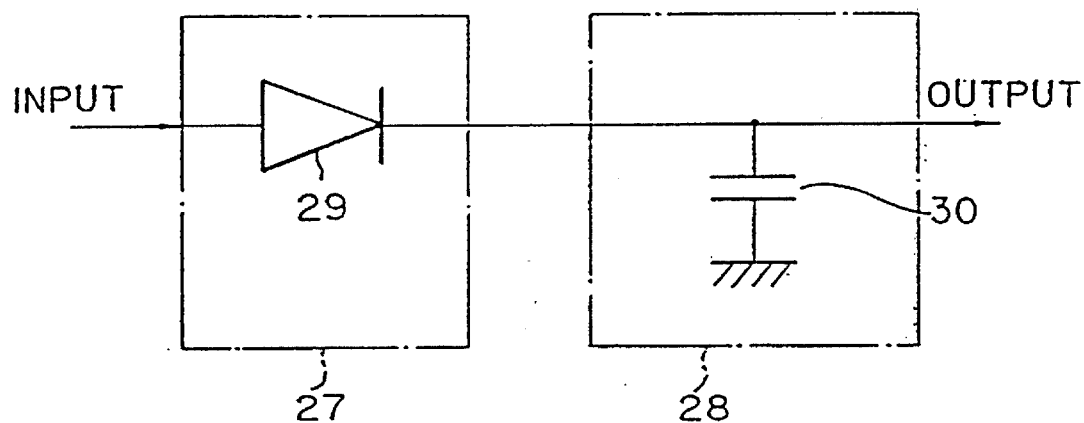
Figure 6:
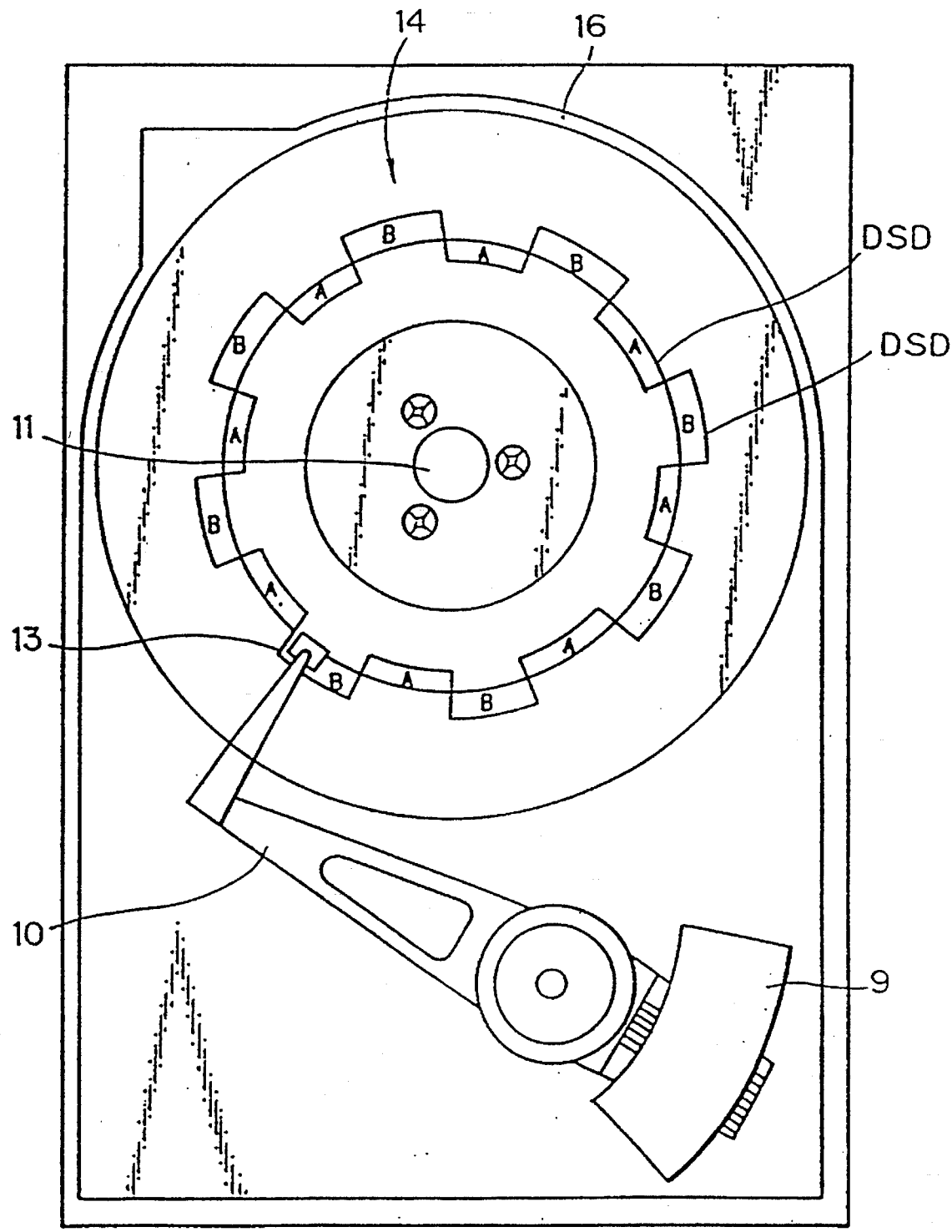
FIG. 6 is a diagram (part 1) for explaining a conventional offtrack compensation.

In FIGS. 1 to 7e, FIG. 1 is a block diagram of a magnetic disk unit; FIG. 2 is an explanatory diagram of a disk mechanism; FIG. 3 is a block diagram of a head positioning servo control unit; FIG. 4 is a block diagram of an offtrack compensating unit; FIGS. 5a and 5b are explanatory diagrams of an offtrack signal generating circuit; FIG. 6 is an explanatory diagram of offtrack compensation (part 1); and FIGS. 7a to 7e are explanatory diagrams of offtrack compensation (part 2).

In FIGS. 1 to 7e, 1 denotes a magnetic disk unit; 2 denotes a controller; 3 denotes a read/write control unit; 4 denotes a disk mechanism; 5 denotes a head positioning servo control unit; 6 denotes a spindle motor control unit; 7 denotes an offtrack compensating unit; 9 denotes a voice control motor (VCM); 10 denotes an actuator; 11 denotes a spindle; 12 denotes a servo head; 13 denotes a data head; 14 denotes a data surface; 15 denotes a servo surface; 16 denotes a magnetic disk; 17 denotes an offtrack judging circuit; 18 denotes a power amplifier; 19 denotes a speed/position control switch circuit; 20 to 22 denote comparators; 23 denotes a positioning signal generating circuit; 24 denotes a speed signal generating circuit; 25 denotes a servo block control unit; 26 denotes an offtrack signal generating circuit; 27 denotes a rectifying circuit; 28 denotes a smoothing circuit; 29 denotes a diode; and 30 denotes a capacitor.

Also, 33 denotes an analog/digital converter; 34 denotes a work register; 35 denotes an arithmetic and logic unit; 36 denotes an offtrack compensated value register; 37 denotes an ontrack slice register; and DSD denotes servo data.

Conventionally, a magnetic disk unit using a servo surface servo system has been known as a magnetic disk unit.

In this kind of magnetic disk unit, a data head does not detect a position in itself, but a servo head mechanically coupled to the data head detects a position.

The relative position between the data head and servo head shifts due to a fluctuation in ambient temperature. Besides, occurrence of an offtrack phenomenon cannot be avoided in theory.

An offtrack compensating technique is available, wherein the shift is measured and compensated therefor.

For offtrack compensation, a shift in the relative position between a servo head and a data head is measured. Then, the data head is offset toward cancelling out the shift. Thus, the data head is positioned.

For a unit having multiple data heads on an arm, the shift and the amount of compensation vary depending on the data head.

Therefore, even in a head switch operation mode that has gained popularity because a seek need not be done to ensure short access time, heads must be moved little by little to compensate for varying amounts of offtrack among the heads.

A prior art of a magnetic disk unit using the aforesaid servo surface servo system will be described in conjunction with the drawings.

As shown in FIG. 1, a magnetic disk unit 1 comprises a controller 2, a read/write control unit 3, a disk mechanism 4, a head positioning servo control unit 5, a spindle motor control unit 6, and an offtrack compensating unit 7.

The controller 2 controls various components in the magnetic disk unit 1, and also controls commands and data transferred to or from a host unit.

The read/write control unit 3 controls reading or writing of data from or in the disk mechanism 4 in response to an instruction from the controller 2.

The head positioning servo control unit 5 receives a seek command from the controller 2 and controls positioning of a head in the disk mechanism 4.

The offtrack compensating unit 7 receives offtrack data from the read/write control unit 3 and information such as a head number from the controller 2, and generates offtrack compensation data.

The spindle motor control unit 6 controls rotation of a spindle motor in the disk mechanism 4.

The disk mechanism 4 has, for example, a construction shown in FIG. 2.

As shown in FIG. 2, the disk mechanism 4 is coupled to a spindle 11 and provided with multiple magnetic disks 16 that are driven by a spindle motor (not shown) and rotate.

Any one of the multiple magnetic disks 16 has a servo surface 15. The other magnetic disks 16 have data surfaces 14.

Then, multiple magnetic heads are installed on an actuator 10 that is driven by a voice coil motor 9.

Among these magnetic heads, the magnetic head associated with the servo surface 15 is regarded as a servo head 12, and all the other magnetic heads associated with the data surfaces 14 are regarded as data heads 13.

The servo head 12 reads servo information from the servo surface 15, and sends the read servo information to the head positioning servo control unit 5. The servo information is used to control head positioning.

The data heads 13 read or write data from or in the data surfaces 14, and are controlled by the read/write control unit 3.

The voice coil motor 9 is driven by the head positioning servo control unit 5, and moves the data heads and servo head 12 in the radial directions of the magnetic disks via the actuator.

The head positioning servo control unit 5 has, for example, a construction shown in FIG. 3.

In FIG. 3, a servo block control unit 25 receives a seek command from a controller 2 and controls head positioning servo control as a whole.

A positioning signal generating circuit 23 modulates a servo signal read by a servo head 12 and generates a position signal.

A speed signal generating circuit 24 inputs the servo signal and generates a speed (actual speed) signal.

A comparator 21 calculates a difference between a target position (instructed value) sent from the servo block control unit 25 and offtrack compensated data (data sent from an offtrack compensating unit 7). A comparator 20 calculates a difference between the difference value calculated by the comparator 21 and the value represented by a position signal (actual position). In short, the comparator 20 calculates a position error.

A comparator 22 calculates a difference between the target speed (instructed value) sent from the servo block control 25 and the speed signal (actual speed) generated by the speed signal generating circuit 24. In short, the comparator 22 calculates a speed error.

A speed/position control switch circuit 19 switches between an output of the comparator 20 (position error signal) and an output of the comparator 22 (speed error signal) in response to a switch signal sent from the servo block control unit 25, and outputs a quantity of operation to a power amplifier 18.

The power amplifier 18 drives a voice coil motor 9 in accordance with an output associated with the quantity of operation, thus achieving head positioning.

An ontrack judging circuit 17 inputs an ontrack slice level sent from the offtrack compensating unit 7, a head number sent from the controller 2, and an output of the comparator 20 (position error signal), and judges whether the head of the head number falls on a track.

The offtrack compensating unit 7 has, for example, a construction shown in FIG. 4.

In FIG. 4, an analog/digital converter (ADC) 33 receives offtrack data from a read/write control unit 3 and converts the data into a digital signal.

An arithmetic and logic unit 35 uses a work register 34 to perform various arithmetic operations on the digitized offtrack data, and outputs the resultant data as an offtrack compensated value and an ontrack slice level.

An offtrack compensated value register 36 inputs a head number from a controller 2 and the offtrack compensated value, and stores the offtrack compensated value in association with the head number.

An ontrack slice register 37 inputs the head number from the controller 2 and the ontrack slice level, and stores the ontrack slice level in association with the head number.

The read/write control unit 3 generates offtrack data using servo information read from a data surface 14 by a data head 13 of a mechanism 4. An offtrack generating circuit employed for this purpose has, for example, a construction shown in FIGS. 5a, 5b.

FIG. 5a is a block diagram, and FIG. 5b shows an example of a circuit. As illustrated, an offtrack signal generating circuit 26 is made up of a rectifying circuit 27 and a smoothning circuit 28.

The rectifying circuit 27 is realized with, for example, a diode 29 as indicated with a symbol in FIG. 5b, and the smoothning circuit is realized with, for example, a capacitor 30.

In a magnetic disk unit having the abovesaid construction, offtrack compensation is performed, for example, as described below.

First, as shown in FIG. 6, data surface servo information DSD is written on not only a servo surface but also a specific area of a data surface 14 of a magnetic disk 16.

As the data surface servo information DSD, a pattern A and a pattern B are written alternately at positions offset by specified amounts with respect to the track center.

Thereafter, during initial seek or automatic adjustment of the disk unit, a data head 13 reads the data surface servo information DS.

Then, the data surface servo information DSD is used to calculate an amount of offtrack. The value is held in memory, and added to servo surface servo information when the head 13 is positioned. Thus, the amount of offtrack is compensated for with the value.

FIGS. 7a to 7e show waves detected at components during offtrack compensation.

Figure 7A:
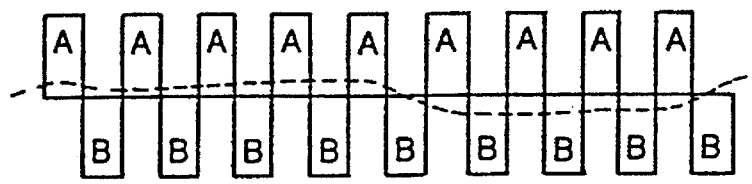
FIGS. 7a to 7e are diagrams (part 2) for explaining the conventional offtrack compensation.
Figure 7B:
Figure 7C:
Figure 7D:
Figure 7E:
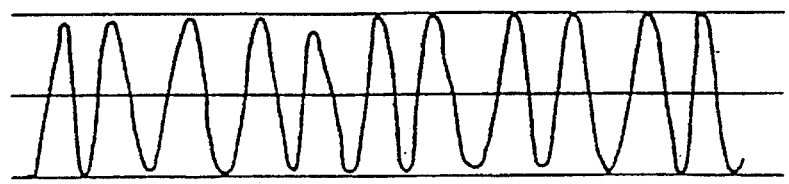

In the figures, FIG. 7a denotes a trajectory of a data head 13 on a data surface containing data surface servo information DSD; FIG. 7b denotes an output of a data surface servo modulator; FIG. 7c denotes an offtrack compensation signal; FIG. 7d denotes a position signal for offtrack compensation; and FIG. 7e denotes an output of a data head during offtrack compensation.

The aforementioned prior art has the following problems to be solved:

In general, a disk mechanism is subject to be slightly deformed and deviated by a change in temperature or by any other environmental changes.

Moreover, when the track pitches become too dense, the tracks are slightly deviated on the same cylinder giving rise to the occurrence of offtrack due to a difference in the amount of expansion and contraction among the magnetic disks and deflection of the spindle.

Therefore, the offtrack has been compensated by writing servo information not only on the servo surface but also on the data surfaces as described above.

However, the offtrack amount undergoes a change with time, and the amount of deviation of the data head position is not often the same as the amount of deviation of the servo head position.

In such a case, the offtrack according to the prior art must be compensated while compensating the servo surface by reading servo information (DSD) on the data surface or compensating the data surface by reading servo information on the servo surface.

Therefore, the offtrack compensation requires a considerable period of time and, besides, it is difficult to compensate the offtrack precisely.

The measured value undergoes a change due to position control errors that develop in a random fashion when the offtrack amount is measured. Therefore, measurement must be taken several times and must be averaged to obtain an effective result of measurement. This requires an extended period of time for measurement as well as increased amounts of calculation. Accordingly, much resources are needed and it is difficult to correctly compensate the offtrack.

Furthermore, when offtrack compensation is performed, if the quantity of offset is large, the head may reach the vicinity of the middle between a servo track and an adjacent servo track.

In this case, it is, generally, difficult for the head to perform stable tracking.

If a measured amount of offtrack takes on a value that is more than half of a width of a track, it is more likely that the disk unit has a mechanical defect.

However, the offtrack compensating method of the prior art does not detect the above events. This leads to deteriorated reliability of data or a disk unit.

Figure 8A:
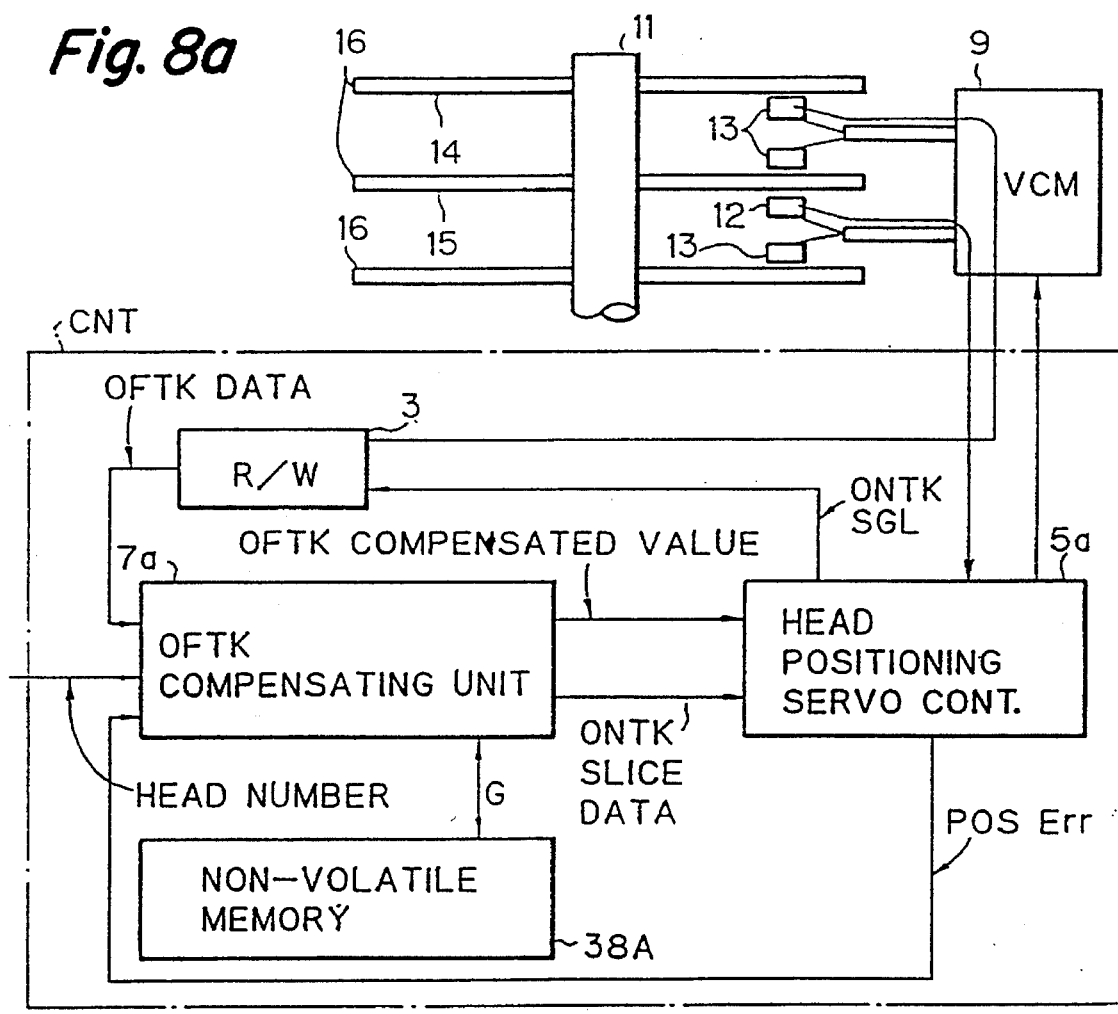
FIGS. 8a and 8b are diagrams illustrating the principle of the first aspect of the present invention.
Figure 8B:
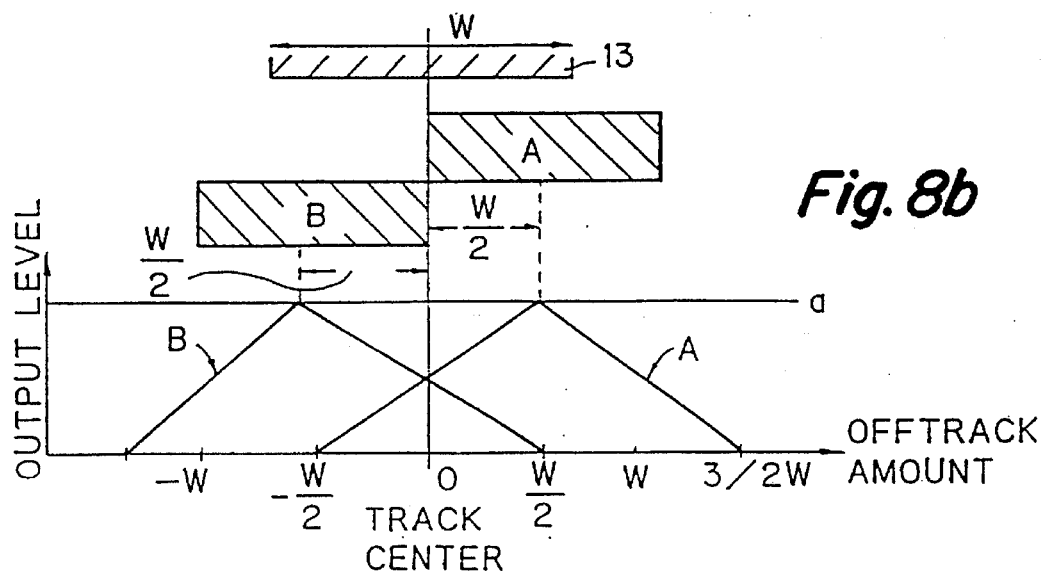

FIGS. 8a and 8b illustrate the principle of the first aspect of the present invention, wherein the same portions as those in FIGS. 1 to 7e are denoted by the same reference numerals.

Here, reference numeral 38A denotes a non-volatile memory; A and B denote servo data; W denotes the core width of the data head 13; "a" denotes an output level; and CNT denotes a control unit.

To solve the aforementioned problems in the prior art, the first aspect of the invention is constituted as follows:

(1) In a method of compensating offtrack of a disk unit comprising: a plurality of disks 16 of which any one surface is a servo surface 15 and the other surfaces are all data surfaces 14; a servo head 12 and data heads 13 arranged on said servo surface and said data surfaces; a positioning mechanism 9 for positioning the servo head and the data heads on desired tracks; and a control unit CNT for controlling said positioning mechanism; wherein said control unit reads servo data from the data surfaces and updates them to find offtrack compensated data, and the head positioning operation is controlled by using said offtrack compensated data and servo information on the servo surface; the improvement wherein the servo track center of the servo head 12 is set as a reference for positioning the head; a pair of servo data for positioning the head are written onto said data surface 14 while giving a predetermined amount which is offset from said track center; a predetermined offset amount is given, and said pair of servo data are read and measured to find a conversion coefficient G; and the offtrack amount detected from said pair of servo data is compensated by a value that is calibrated by using said conversion coefficient G.

(2) In the constitution (1), said pair of servo data include a set (A, B).

(3) In the constitution (2), said pair of servo data A, B are written on both sides of said track center while giving an equal offset amount to said both sides (inner side and outer side of a cylinder).

(4) In the constitution (3), said conversion coefficient G is found by giving an equal offset amount to both sides of said track center (inner side and outer side of the cylinder) and reading the pair of servo data A, B at positions corresponding to the offset amount.

(5) In the constitution (4), said conversion coefficient G is found by reading and measuring a pair of servo data for each of the positions that correspond to offset amounts thereby to find a difference in the values of the offtracks, and then by finding a practical offtrack amount from the value of error.

(6) In the constitution (1), said conversion coefficient G is a ratio of an offset amount that is given at the time of reading the pair of servo data to a real offtrack amount that is measured by reading the pair of servo data.

(7) In the constitution (1), said conversion coefficient G is stored in a non-volatile memory 38A, and the offtrack compensated data is calibrated by using the conversion coefficient G that is read from said non-volatile memory 38A.

(8) In the constitution (1), the offtrack amount detected from said pair of servo data is compensated by a value that is obtained by subtracting a position control error (POS Err) at the time when the offtrack amount is detected from a value that is calibrated by using said conversion coefficient G.

(9) In the constitution (2), when the offset amount or the value of servo data A, B and the real offtrack amount of the head are not on a linear relationship, the amount is divided into such small sections that said relationship can be sufficiently regarded to be a linear one, and the conversion coefficients are found for each of the sections.

(10) In the constitution (1), the pairs of servo data include a plurality of sets (a set of A and B, a set of C and D, a set of E and F, etc.).

(11) In the constitution (10), said pairs of servo data are written in a manner that the pair of data A, B of a given set are written on both sides of the track center (inner side and outer side of the cylinder), and the data of other sets are written about positions which are remote by predetermined amounts from said track center.

(12) In the constitution (11), the conversion coefficients are found for each of the sets of servo data by reading and measuring pairs of servo data while giving a predetermined offset amount for each of the sets.

(13) In the constitution (12), the pair of servo data of a given set are read and measured out of said sets, and a conversion coefficient found from these values is used as a representative value G for the plurality of sets of servo data.

(14) In the constitution (1), a processing for finding said conversion coefficient G is carried out during the fabrication of the devices or during the adjustment of the devices before the shipment.

(15) In the constitution (1), a processing for finding said conversion coefficient G is carried out at a place of a user after the shipment.

(16) In the constitution (15), the processing for finding the conversion coefficient G is carried out when the combination of a mechanical unit and a control unit of the disk unit is changed.

(17) In the constitution (1), the offtrack is compensated after every given period of time by using a value that is calibrated by using the conversion coefficient G.

(18) In the constitution (1), the temperature of the disk unit is measured, and the offtrack is compensated by using a value calibrated by using said conversion coefficient G under the condition of the measured temperature.

(19) In the constitution (1), error is monitored while the disk unit is in operation, and the offtrack is compensated by using a value calibrated by using said conversion coefficient G under the condition of the error data.

The operation of the first aspect of the present invention based on the above constitutions will now be described with reference to FIGS. 8a, 8b.

In the control unit CNT shown in FIG. 8a, the offtrack compensating unit 7a receives an offtrack data from the read/write control unit 3 and a head number from the host controller, and forms an offtrack compensated data and an ontrack slice data.

The head positioning servo control unit 5a receives a servo signal read by the servo head 12 and an offtrack compensated data from the offtrack compensating unit 7a, and performs the servo control for positioning the head in accordance with an instruction from the host controller.

A non-volatile memory 38A is provided in the control unit CNT of the apparatus, a conversion coefficient G that is found is stored in the non-volatile memory 38A, and the offtrack compensated data is calibrated by using the conversion coefficient G at the time of executing the calibration.

The conversion coefficient G is found at the time of adjustment of, for example, prior to shipment, and is used at the time of calibration at the user's place.

Then, the offtrack compensation can be accomplished correctly and within short periods of time despite head positioning error that develops due to a change in environment or a change in the temperature.

During the measurement of offtrack amount, furthermore, the position control error is subtracted in order to correctly compensate the offtrack irrespective of the magnitude of position error.

In finding a conversion coefficient G, a plurality of pairs of servo data are written and the offtrack amount is detected over a wide range, in order to correctly compensate the offtrack over a wide range.

Preferred embodiments according to the first aspect of the present invention will now be described with reference to the drawings.

Figure 9:
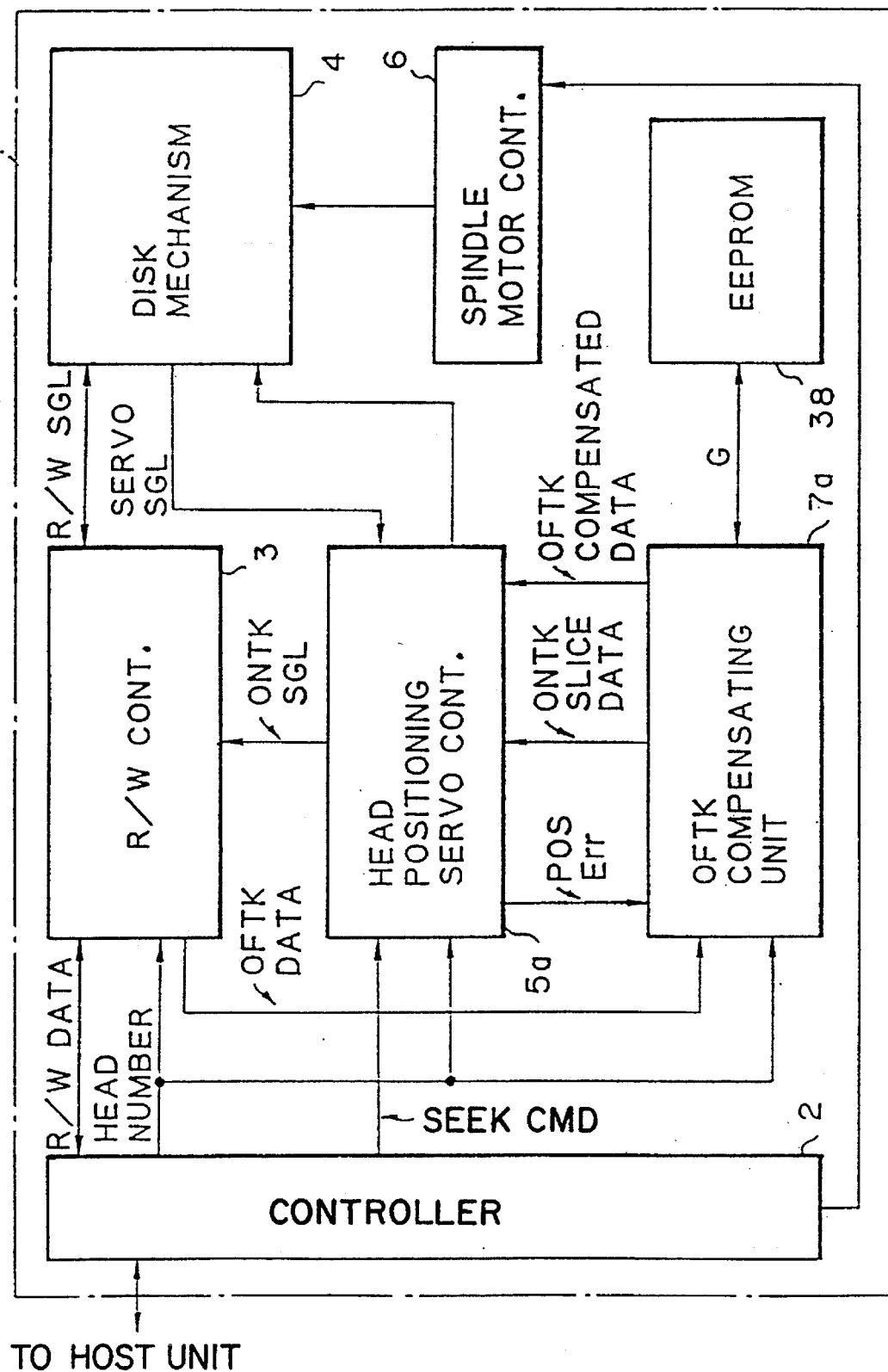
FIG. 9 is a block diagram of a magnetic disk unit.
Figure 10:
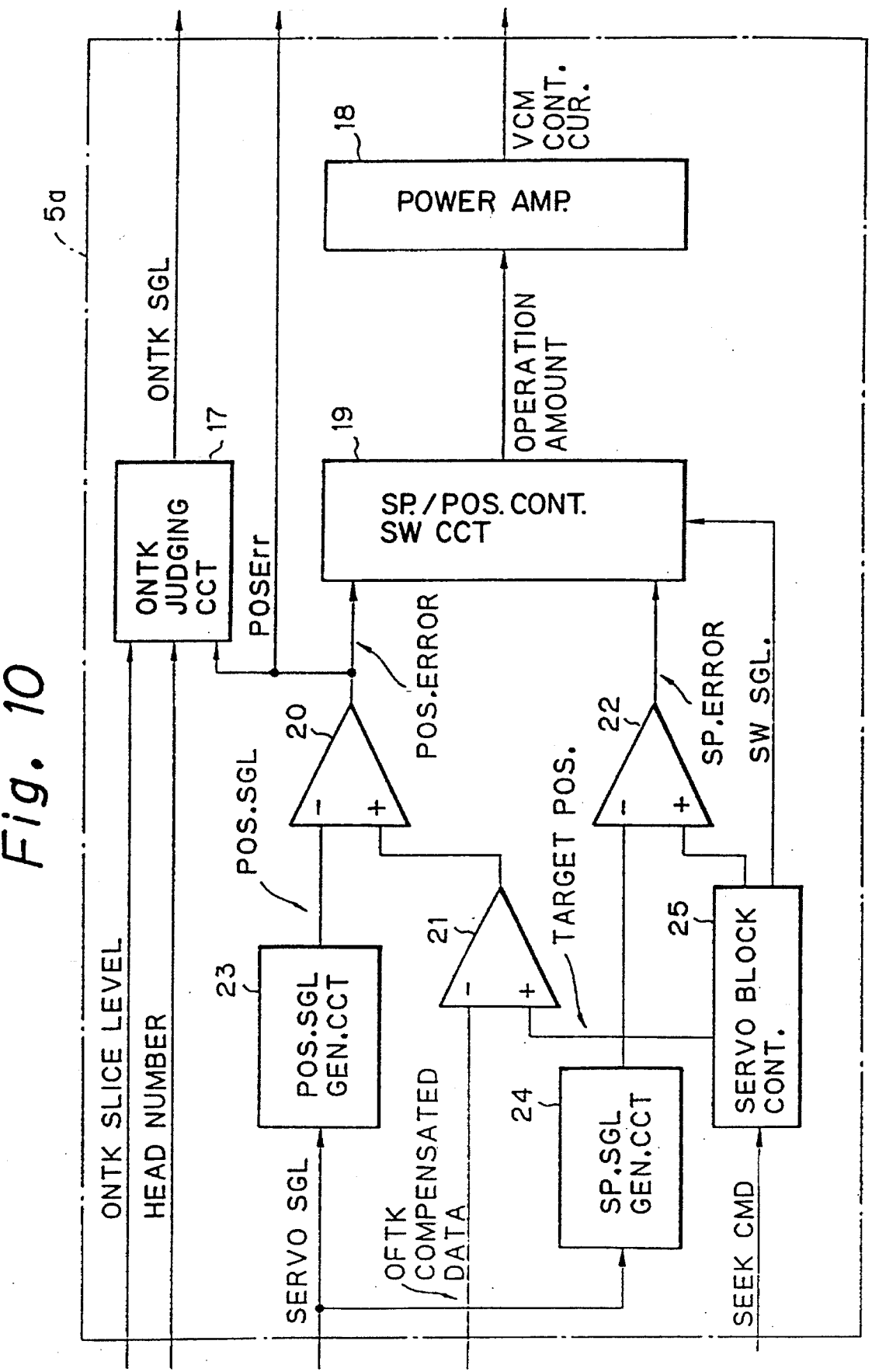
FIG. 10 is a block diagram of a servo control unit for head positioning.
Figure 11:
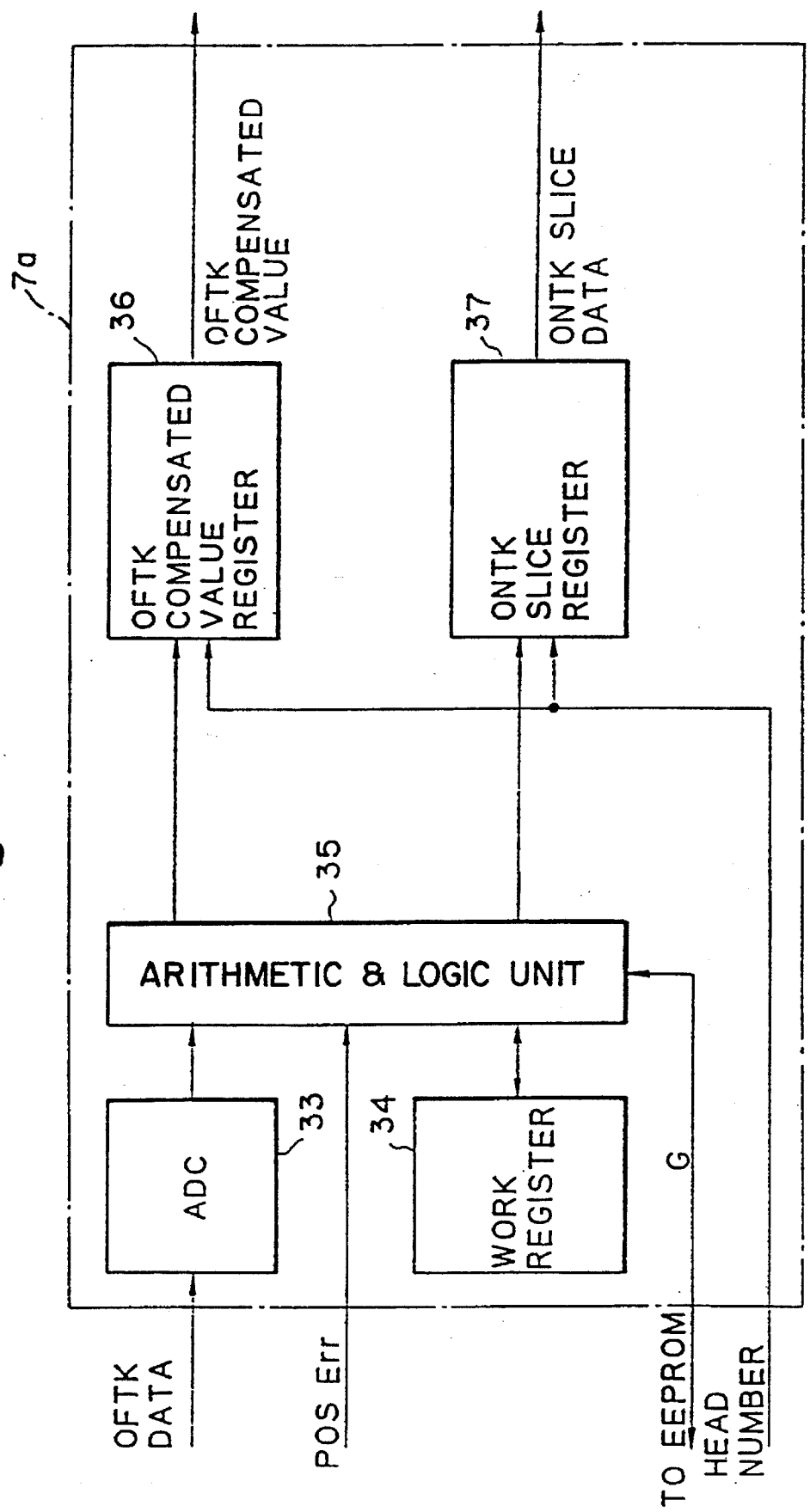
FIG. 11 is a block diagram of an offtrack compensating unit.
Figure 12A:
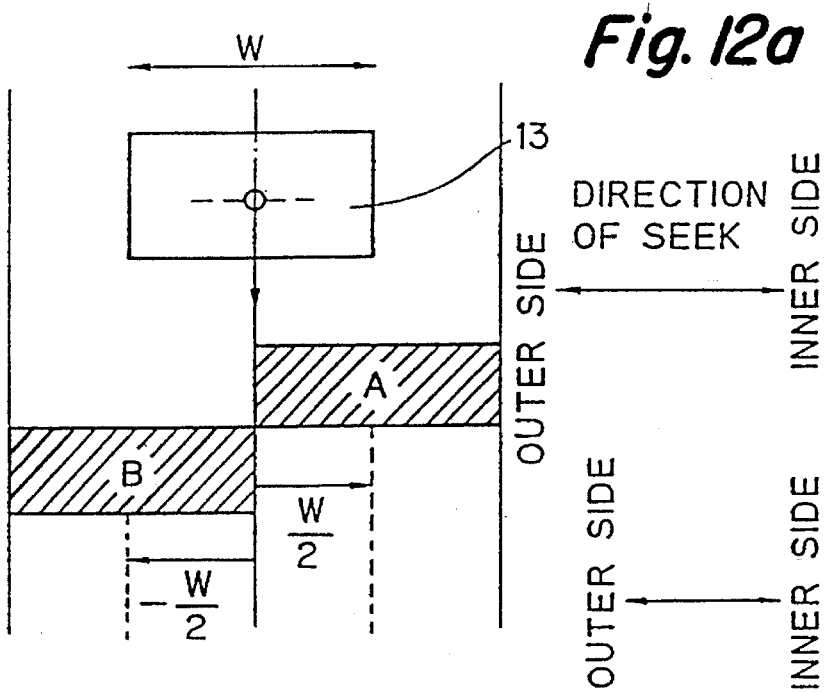
FIGS. 12a to 12c are diagrams illustrating head positioning data.
Figure 12B:
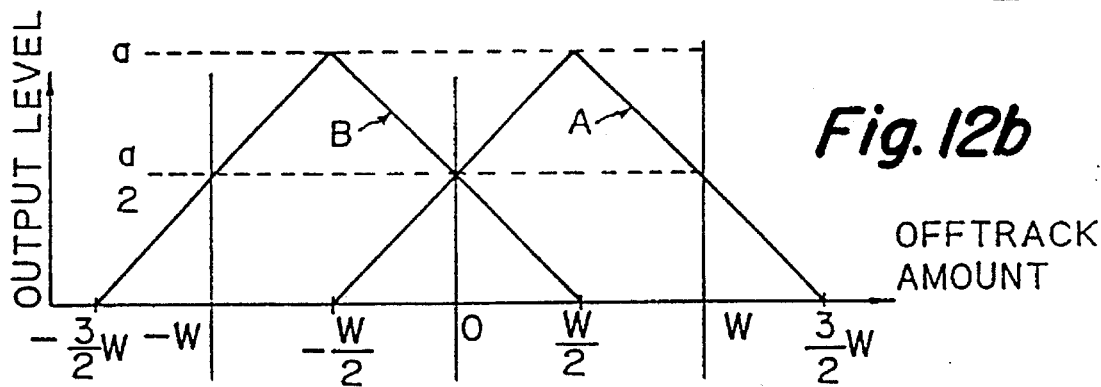
Figure 12C:
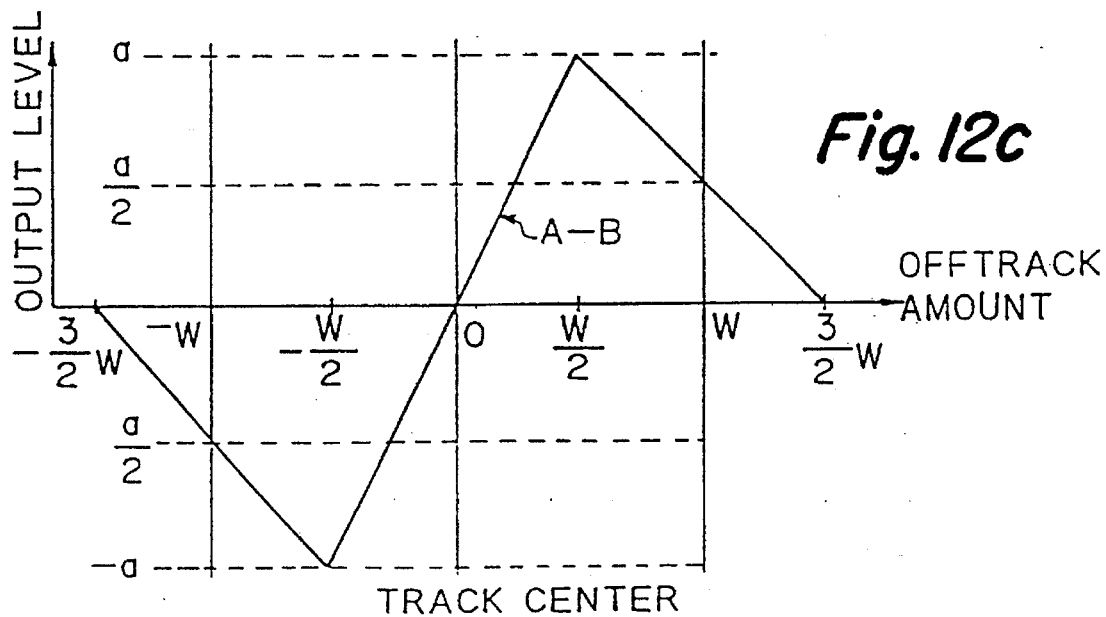
Figure 13:
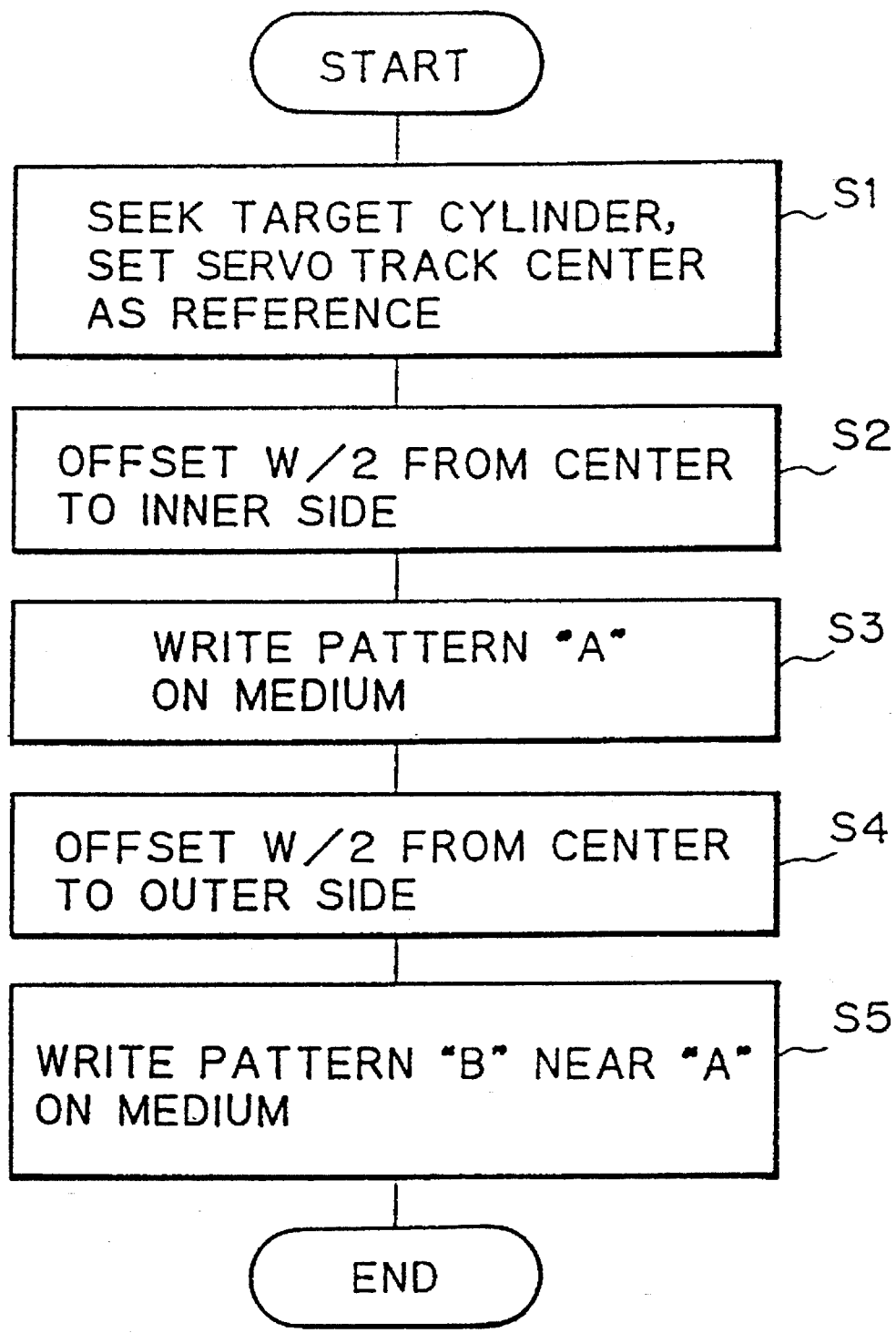
FIG. 13 is a flowchart of a positioning data write processing.
Figure 14B:
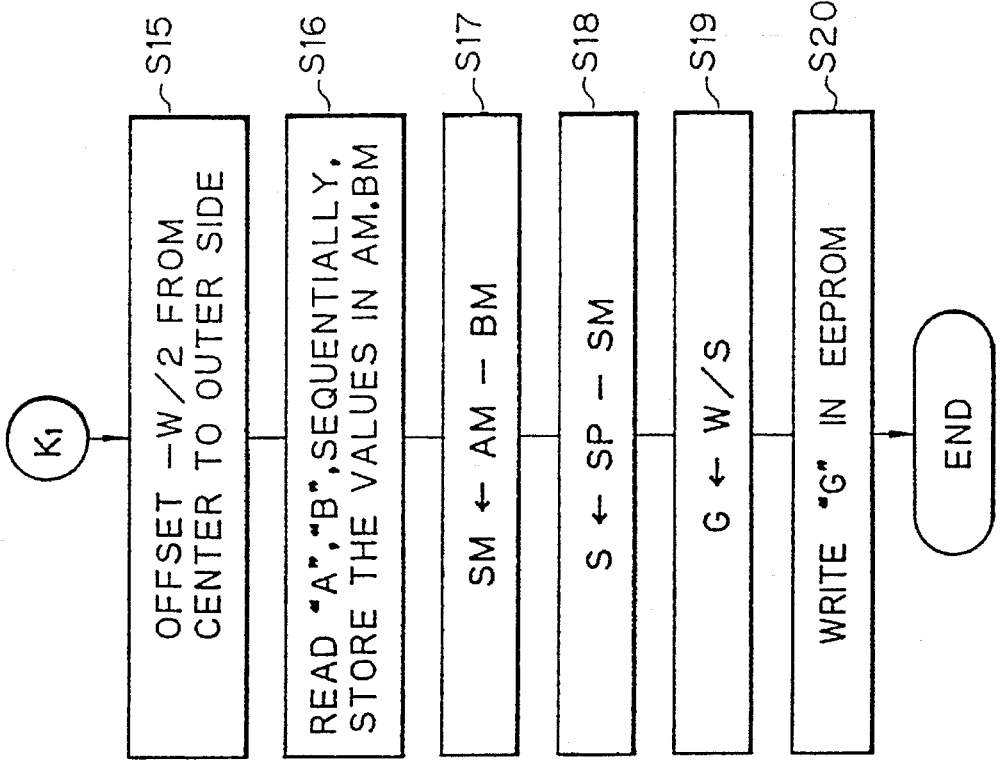
FIGS. 14a and 14b are flowcharts of a training sequence for determining a conversion coefficient.
Figure 14A:
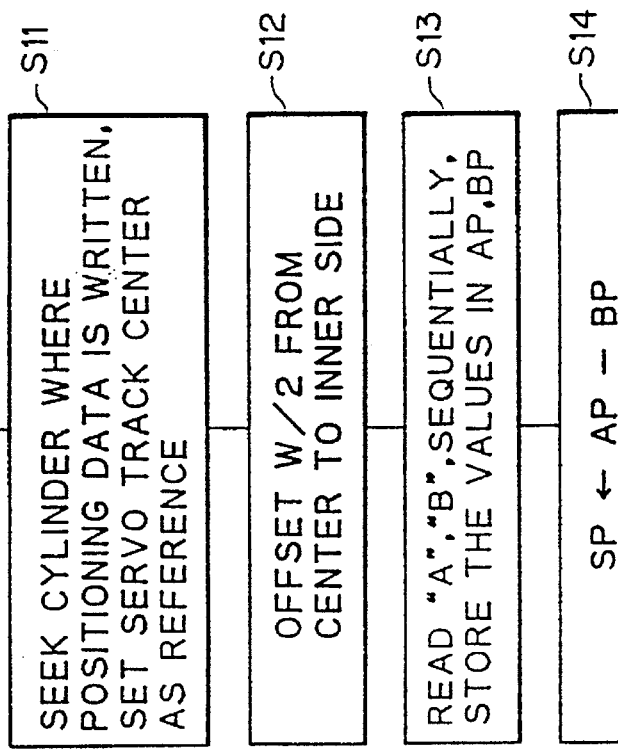
Figure 15:
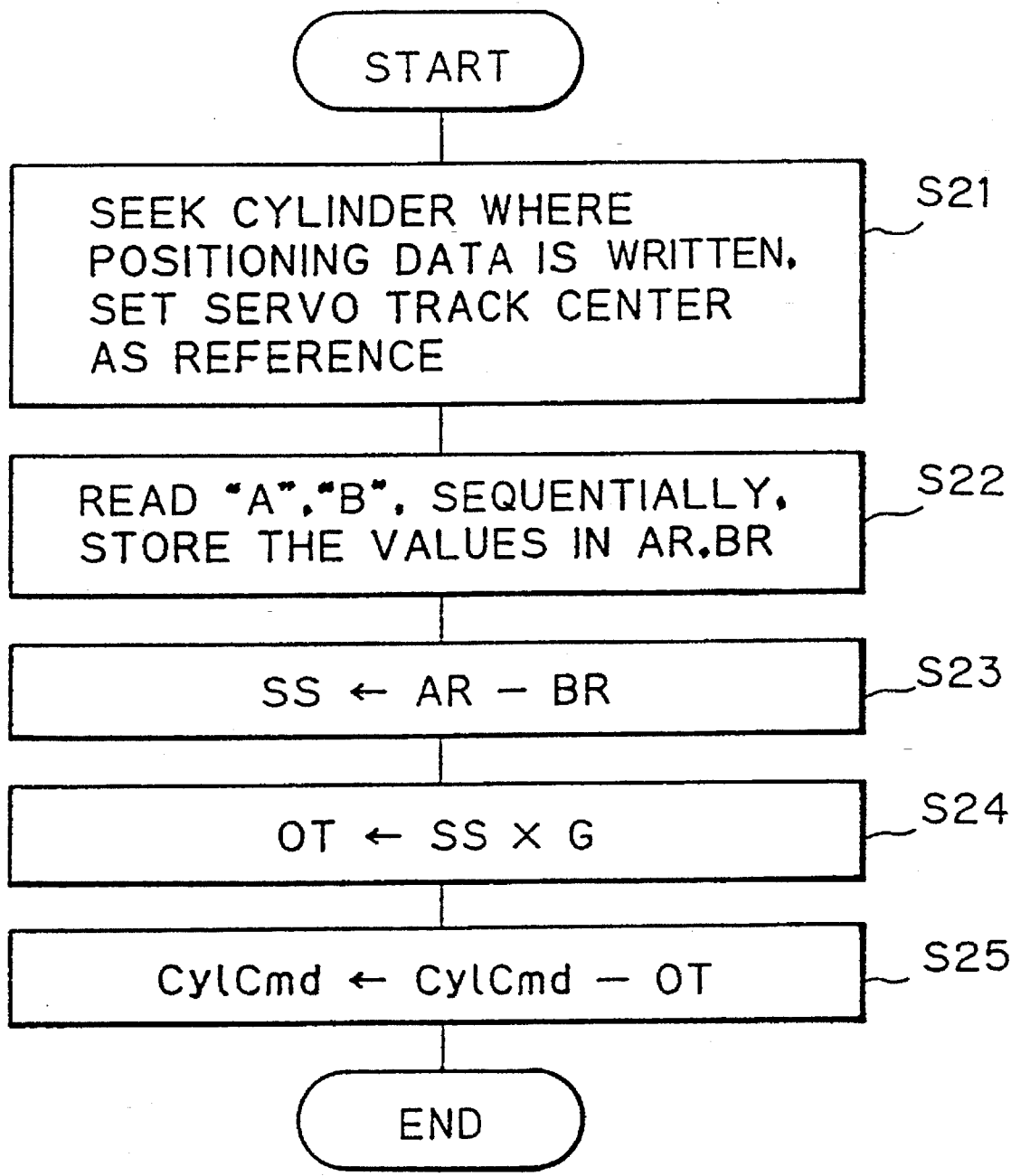
FIG. 15 is a flowchart of an offtrack compensation processing according to embodiment 1.
Figure 16:
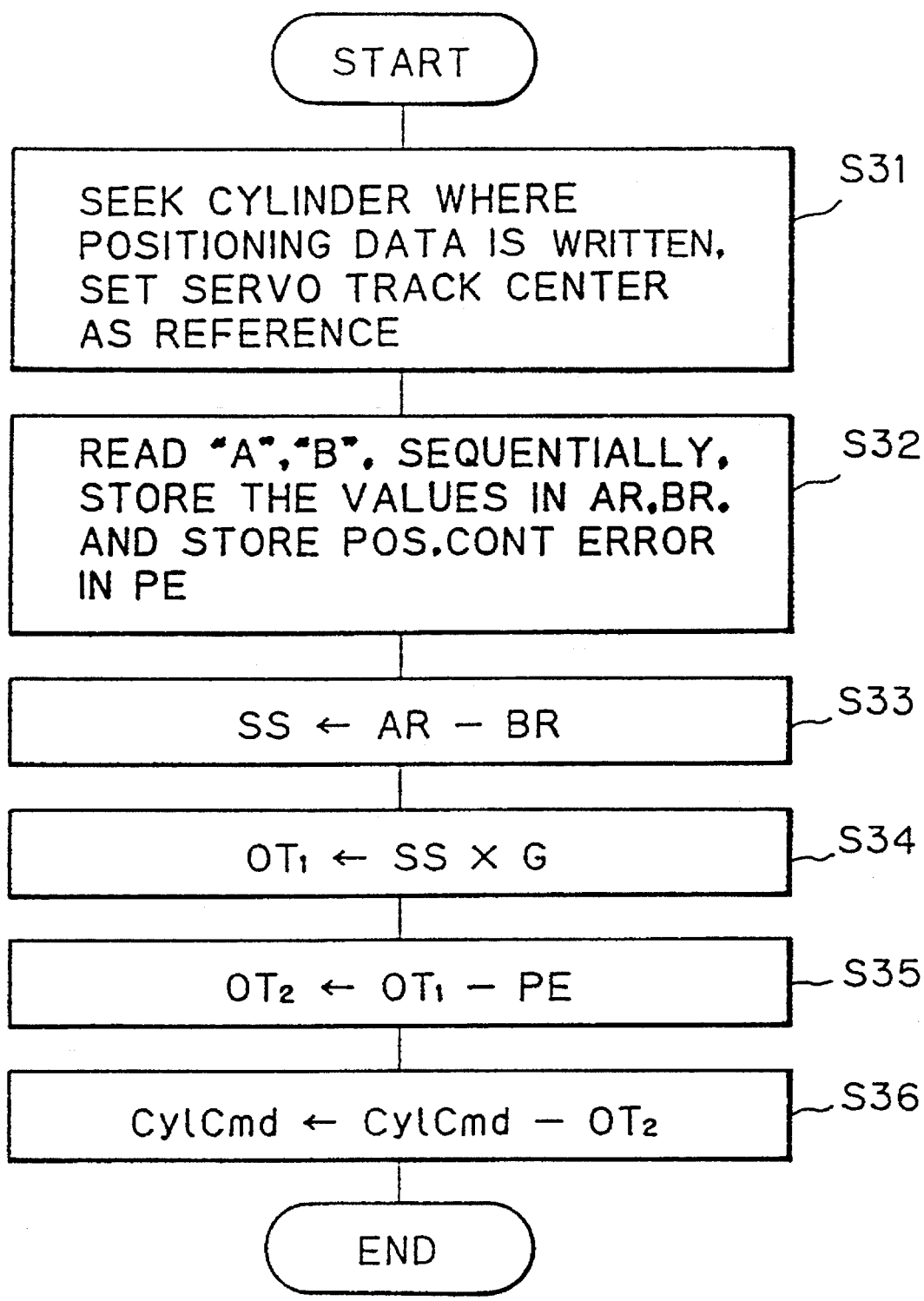
FIG. 16 is a flowchart of an offtrack compensation processing according to the embodiment 2.
Figure 17:
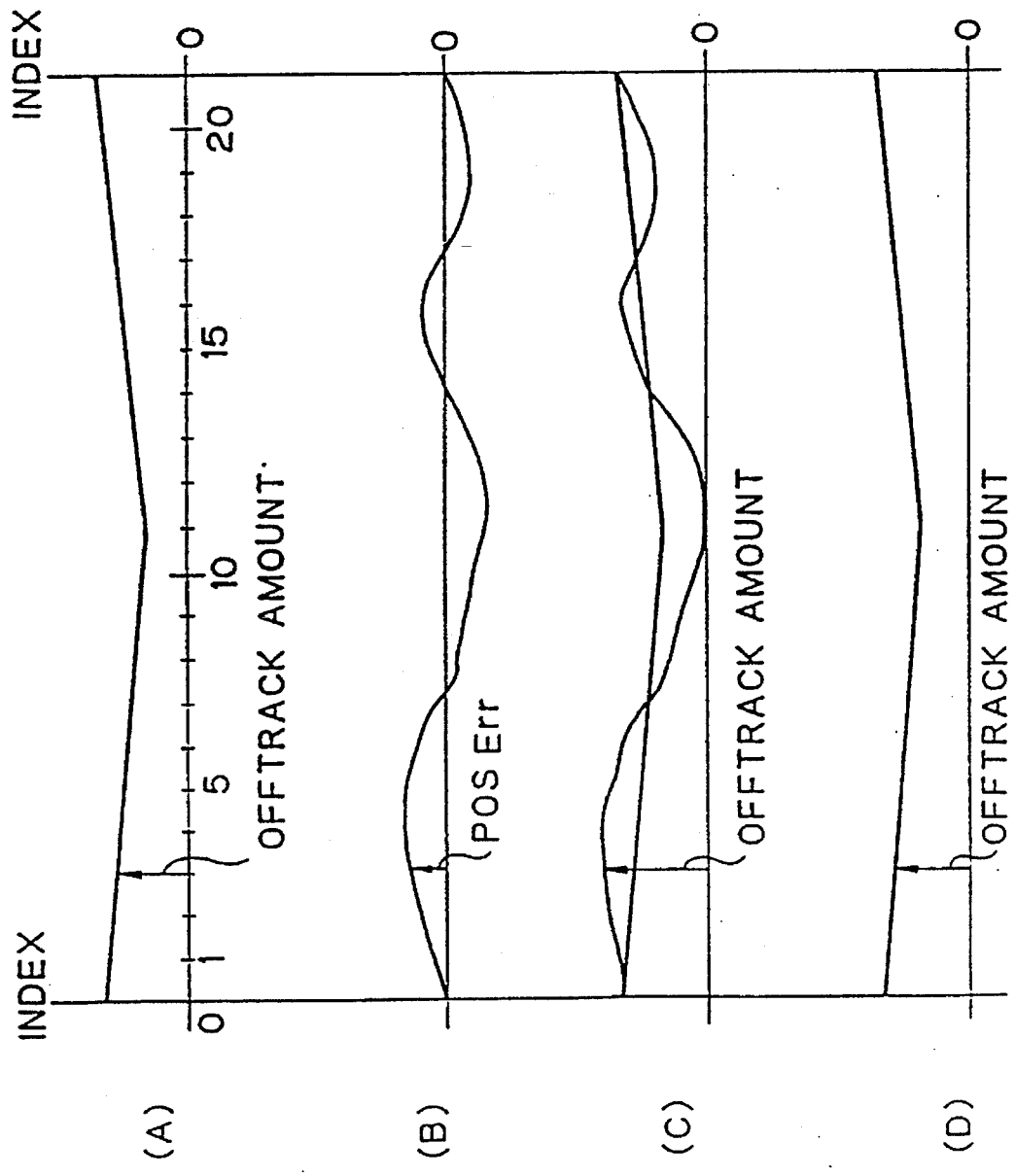
FIG. 17 is a diagram for explaining the waveforms according to embodiment 2.
Figure 18:
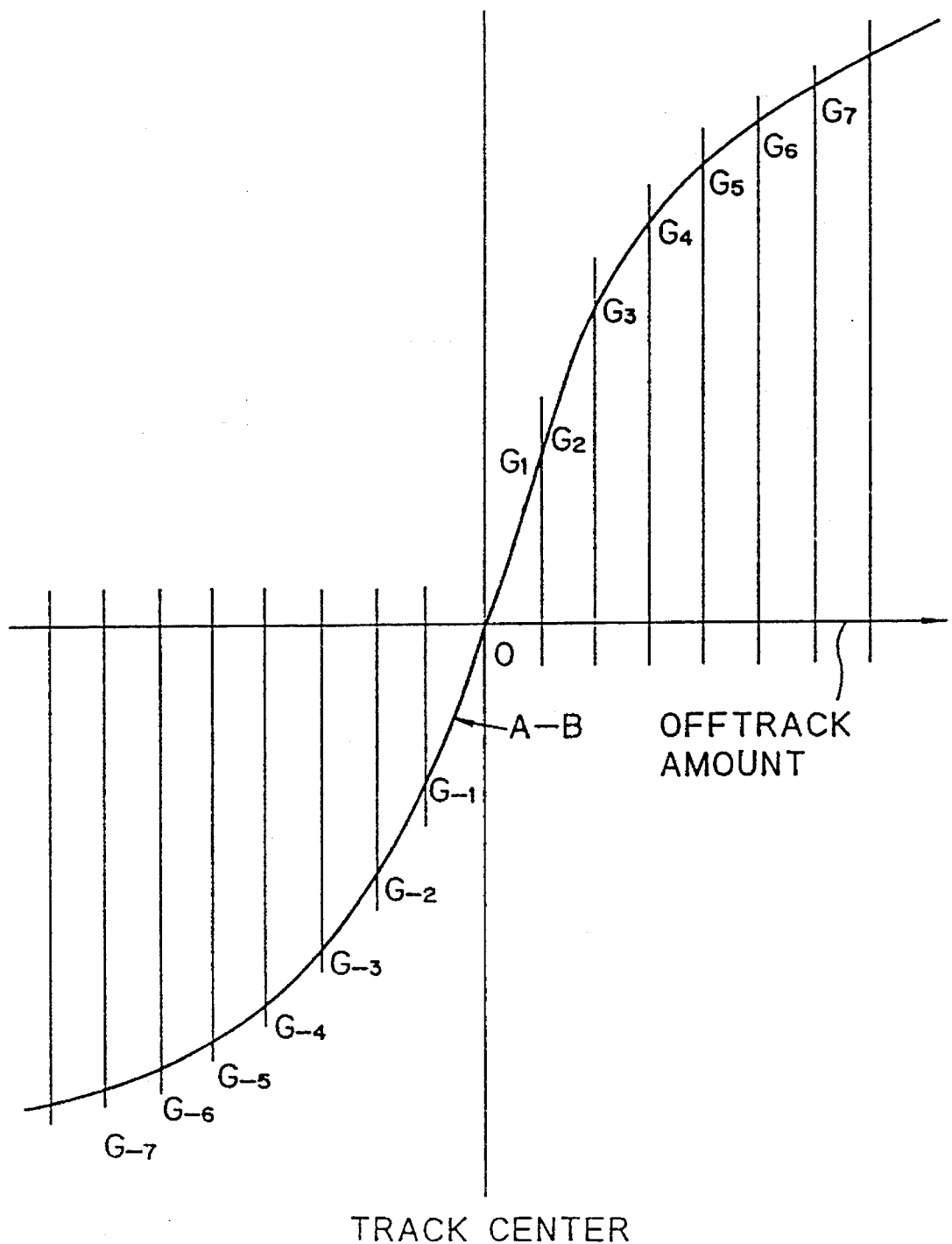
FIG. 18 is a diagram illustrating another example (embodiment 3) for determining a conversion coefficient.
Figure 19:
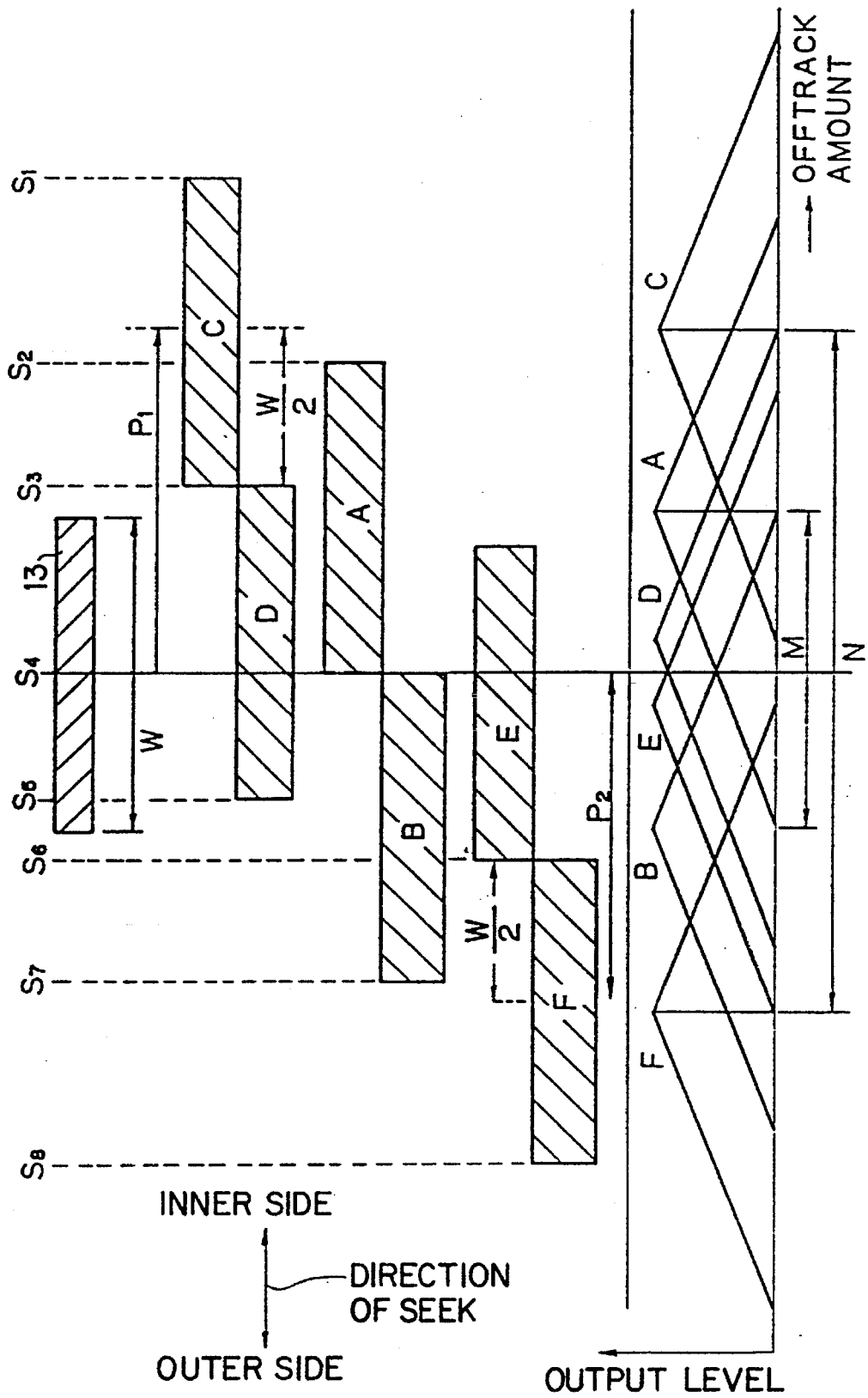
FIG. 19 is a diagram illustrating head positioning patterns according to embodiment 4.
Figure 20:
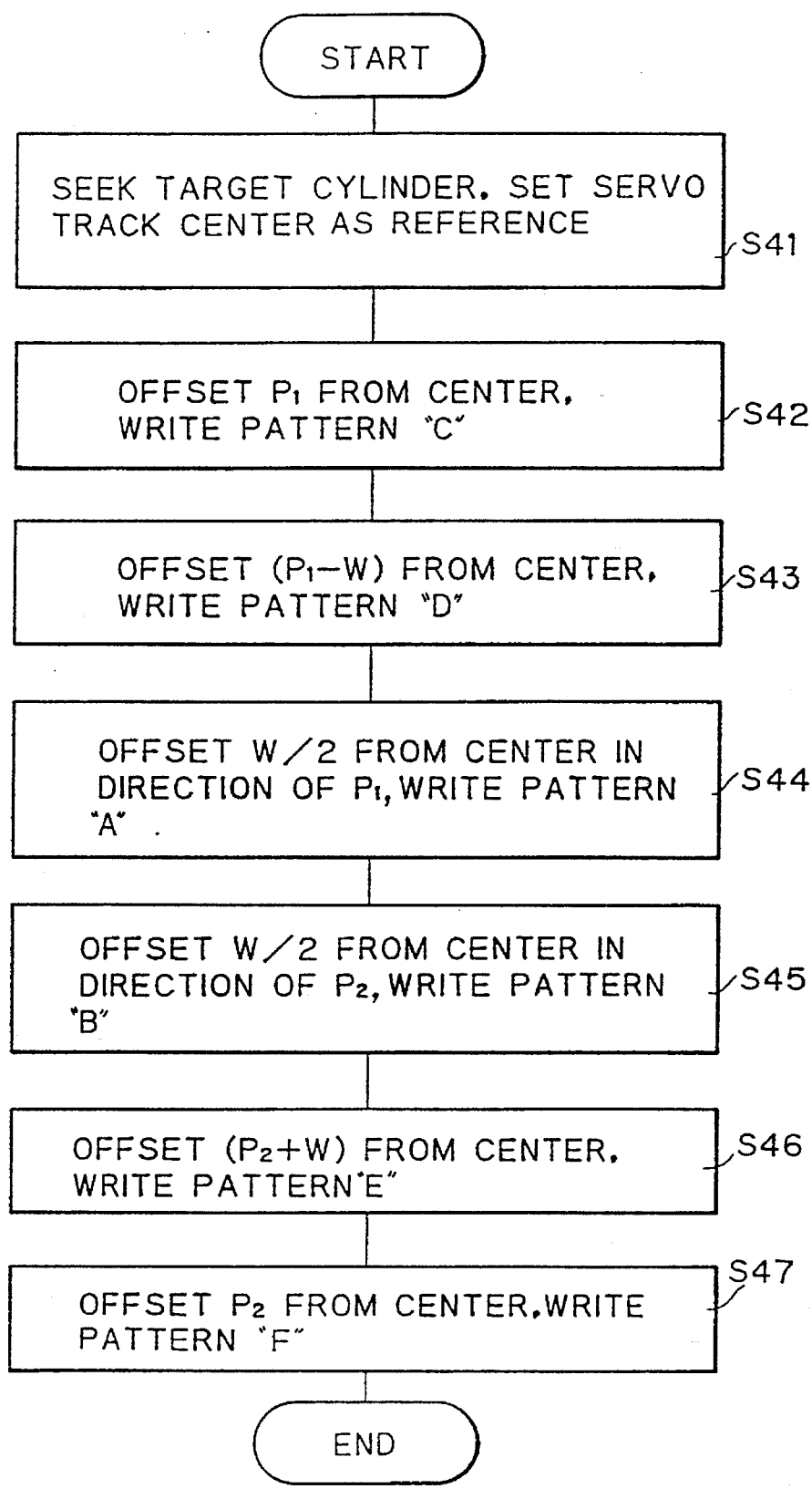
FIG. 20 is a flowchart of a positioning data write processing according to embodiment 4.
Figures 21A, 21B:
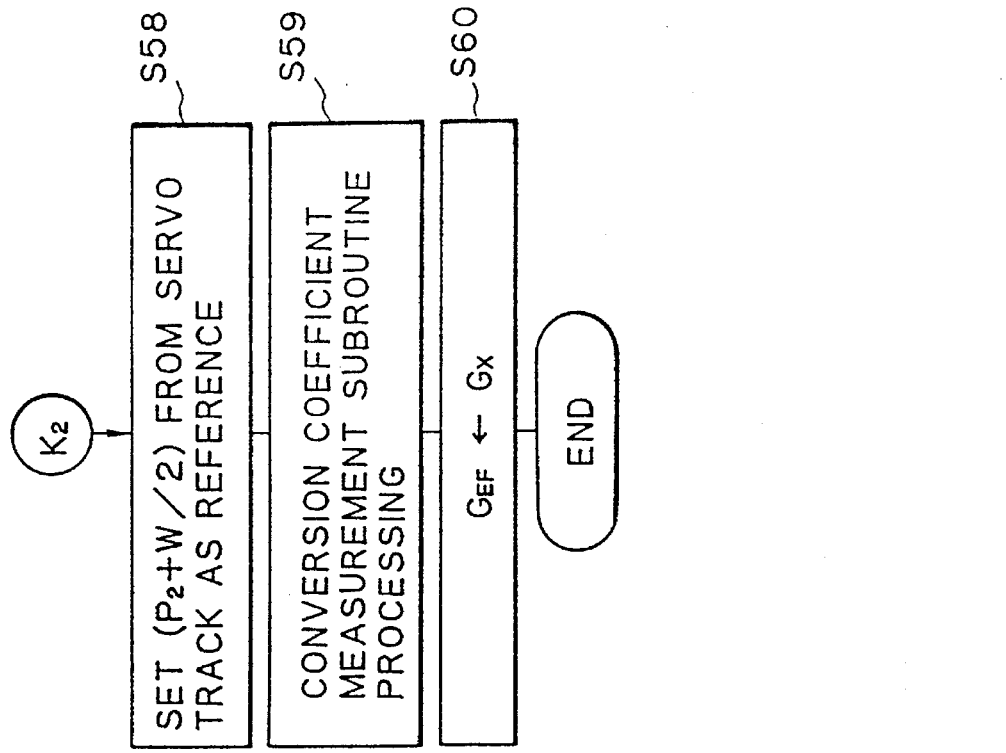
FIGS. 21a and 21b are flowcharts of a training sequence for determining a conversion coefficient according to embodiment 4.
Figure 22:
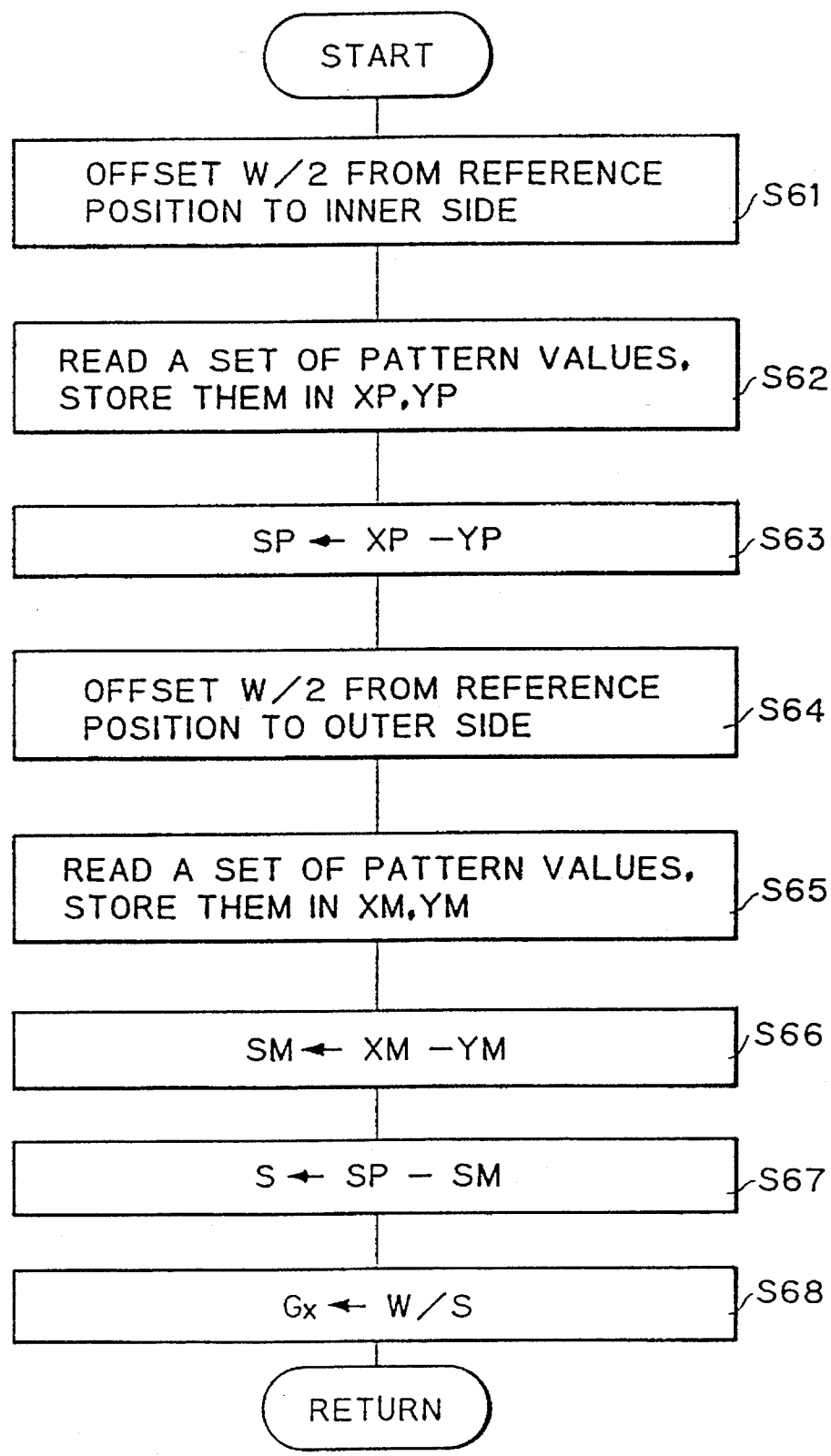
FIG. 22 is a flowchart of a conversion coefficient measurement subroutine processing according to embodiment 4.
Figure 23A:
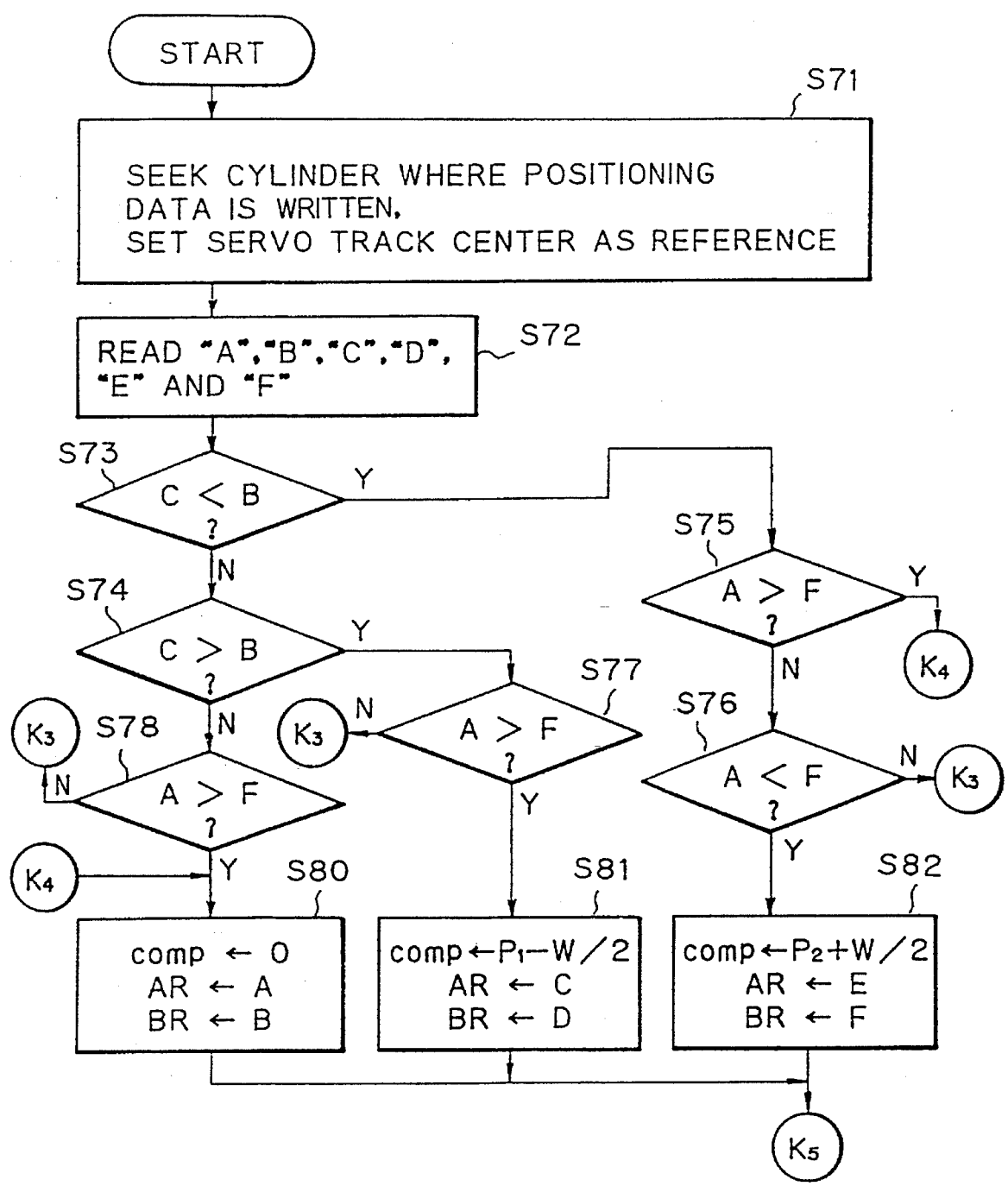
FIG. 23a is a flowchart (part 1) of an offtrack compensation processing according to embodiment 4.
Figure 23B:
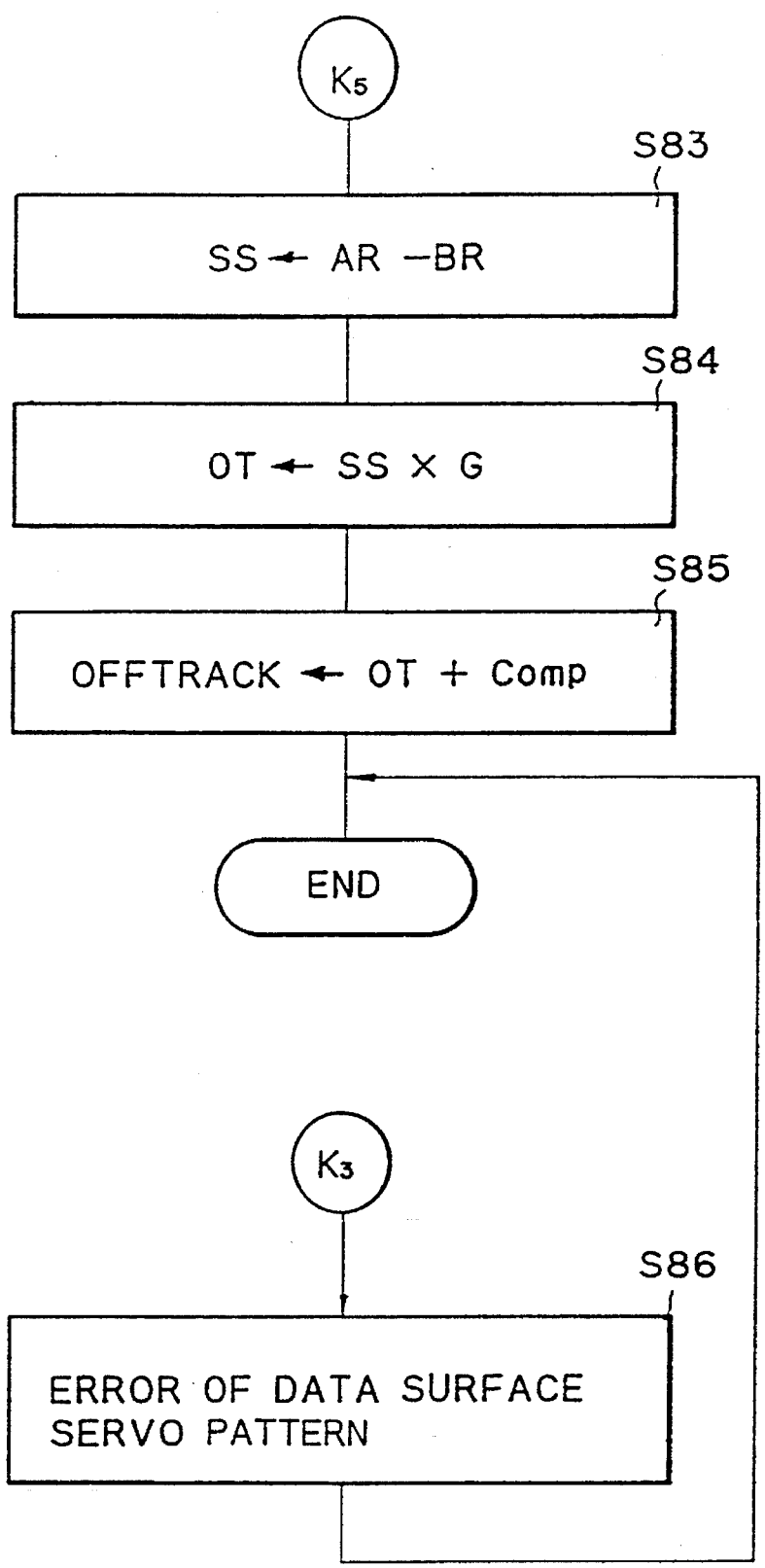
FIG. 23b is a flowchart (part 2) of an offtrack compensation processing according to embodiment 4.

FIGS. 9 to 23b illustrate the preferred embodiments, wherein FIG. 9 is a block diagram of a magnetic disk unit; FIG. 10 is a block diagram of a servo control unit for positioning the head; FIG. 11 is a block diagram of an offtrack compensating unit; FIGS. 12a to 12c are diagrams explaining head positioning data; FIG. 13 is a flowchart of a positioning data write processing (embodiment 1); FIGS. 14a and 14b are diagrams of a training sequence for finding a conversion coefficient (embodiment 1); FIG. 15 is a flowchart of an offtrack compensation processing (embodiment 1); FIG. 16 is a flowchart of an offtrack compensation processing (embodiment 2); FIG. 17 is a diagram for explaining the waveforms of embodiment 2; FIG. 18 is a diagram illustrating how to find a conversion coefficient (embodiment 3); FIG. 19 is a diagram explaining head positioning data (embodiment 4); FIG. 20 is a flowchart of a positioning data write processing (embodiment 4); FIGS. 21a and 21b are diagrams of a training sequence for finding a conversion coefficient (embodiment 4); FIG. 22 is a flow chart of a conversion coefficient (Gx) measurement subroutine processing (embodiment 4); FIG. 23a is a flowchart of an offtrack compensation processing (part 1) (embodiment 4); and FIG. 23b is a flowchart of the offtrack compensation processing (part 2) (embodiment 4).

In FIGS. 9 to 23b, those which are the same as those of FIGS. 1 to 7e are denoted by the same reference numerals. Furthermore, reference numeral 38 denotes an EEPROM (electrically erasable and programmable ROM).

(1) Description of the units used in the embodiments—see FIGS. 9 to 11.

A magnetic disk unit of the servo surface servo system used in the embodiments of the first aspect of the present invention is constituted as shown in FIGS. 9 to 11.

As shown in FIG. 9, the magnetic disk unit 1 is constituted by a host controller 2, a read/write control unit 3, a disk mechanism 4, a head positioning servo control unit 5a, a spindle motor control unit 6, an offtrack compensating unit 7a, and an EEPROM (electrically erasable and programmable ROM) 38.

In the block diagram of FIG. 9, the portions other than the EEPROM 38 are constituted in the same manner as those of the aforementioned prior art, and are not described here.

The servo control unit 5a for positioning the head is constituted, as shown in FIG. 10, by an ontrack judging circuit 17, a power amplifier 18, a speed control/position control switching circuit 19, comparators 20 to 22, a position signal generating circuit 23, a speed signal generating circuit 24, and a servo block control unit 35.

The servo control unit 5a for positioning the head is constituted in the same manner as that described before except that a position error signal (POS Err) formed by the comparator 20 is output to the offtrack compensating unit 7.

As shown in FIG. 11, the offtrack compensating unit 7a is constituted by an analog-to-digital converter (ADC) 33, a work register 34, an arithmetic and logic unit 35, an offtrack compensated value register 36, and an ontrack slice register 37.

In this case, the arithmetic and logic unit 35 receives offtrack data from the read/write control unit 3, a position error signal (POS Err) from the head positioning servo control unit 5a, and data from the EEPROM 38. The result calculated by the arithmetic and logic unit 35 is transferred to the EEPROM 38.

In other respects, the offtrack compensating unit 7a is constituted in the same manner as the aforementioned prior art.

(2) Method of compensating the offtrack.

In the following description, the portions same as those of the prior art are explained in conjunction with the drawings of the prior art.

① Embodiment 1—see FIGS. 12a to 15.

In order to compensate the offtrack in the magnetic disk unit, the amount of position deviation of the servo head 12 and the data head 13 relative to each other is measured, and the data head is positioned being offset to a direction in which the amount of deviation is cancelled.

In the embodiment 1, positioning data (servo data to be written on the data surface) are written onto the data surface that serves as a reference in accordance with the procedure of FIGS. 12a to 12c under the condition where the offtrack amount is sufficiently stabilized.

Next, a conversion coefficient G is found in compliance with the training sequence shown in FIG. 13, and is stored in the EEPROM 38.

Thereafter, the calibration seek is effected to measure the offtrack amount which is then calibrated by using the conversion coefficient G read from the EEPROM 38, and the calibrated value is used as a new offtrack amount for compensating the offtrack.

The embodiment will now be described in detail in conjunction with the drawings.

Description of positioning data—see FIGS. 12a to 12c.

The positioning data used in this embodiment (hereinafter referred to as pattern or positioning pattern in the embodiment) are written as shown in FIG. 12a.

Referring to FIG. 12a, the data head 13 has a core width (width in the direction of seek) W, and the patterns A and B are written while offsetting the data head 13 by W/2 and −W/2 with respect to the track center.

When the patterns A and B are read being offset by a predetermined amount with respect to the track center, the output levels thereof describe a waveform as shown in FIG. 12b. In FIGS. 12b and 12c, the abscissa represents the offtrack amount (inner side is positive) from the track center and the ordinate represents the output level.

When the pattern A is read, for instance, the output level is "0" when it is read at a position 3/2W, the output level is "a/2" when it is read at a position W, the output level is "a" (max) when it is read at a position W/2, the output level is "a/2" when it is read at a position "0" (no offset), and the output level is "0" when it is read at a position −W/2.

When the pattern B is read, the output level is "0" when it is read at a position W/2, the output level is "a/2" when it is read at a position "0", the output level is "a" (max) when it is read at a position −W/2, the output level is "a/2" when it is read at a position −W, and the output level is "0" when it is read at a position −3/2W. The inner side of the track center is represented by "+" and the outer side is represented by "−".

Therefore, if the patterns A and B are read at, for example, the position W/2, the output level of (A-B) becomes "a", since the output level of the pattern A is "a" and the output level of the pattern B is "0".

Moreover, if the patterns A and B are read at the position −W/2, the output level of (A-B) becomes "−a", since the output level of the pattern A is "0" and the output level of the pattern B is "a".

Furthermore, if the patterns A and B are read at the position C, the output level of (A-B) becomes "0", since their output levels have the same value (a/2). Therefore, the output level of (A-B) becomes as shown in FIG. 12c.

Description of positioning data write processing—see FIG. 13 (process numbers in FIG. 13 are given in parentheses).

First, the control seeks a cylinder on which the patterns are to be written.

Then, the servo track center of the servo head 12 is set to be a reference of positioning (S1).

Next, as shown in FIG. 12a, the pattern A (positioning pattern) is written at a point on the circumference of the medium (S3) being offset by W/2 (W is the core width of the data head) toward the inner side from the track center (S2).

Then, the pattern B is written near the pattern A on the circumference of the medium (S5) being offset by −W/2 toward the outer side from the track center (S4).

As described above, the patterns A and B (servo data) are written onto the data surfaces while seeking the offset as shown in FIG. 12a. In this case, the offset amount (OFFSET) may be arbitrarily set within a range of −W/2≦OFFSET≦W/2.

Description of the training sequence for finding the gain G—see FIGS. 14a, 14b.

In FIGS. 14a, 14b, symbols AP, BP, SP, AM, BM, SM and S denote registers in the work register 34 of FIG. 11. The process numbers in FIGS. 14a, 14b are given in parentheses.

In this processing, first, a cylinder in which the positioning data (the above-mentioned patterns A and B) are written on the data surfaces is sought.

Then, the servo track center of the servo head is set to be a reference of positioning (S1).

Next, the previously written patterns A and B are read out in this order being offset (S12) by W/2 (W is the core width of the data head) toward the inner side from the track center, and the values are stored in the registers AP and BP (S13).

That is, the value obtained by reading the pattern A in the above-mentioned state is stored in the register AP and the value obtained by reading the pattern B is stored in the register BP.

The calculation (AP-BP) is performed by the arithmetic and logic unit 35 of FIG. 11, and the result of calculation is stored in the register SP (S14).

Next, the patterns A and B are read out in this order being offset (S15) by −W/2 toward the outer side from the track center, and the values are stored in the registers AM and BM (S16).

Thereafter, the calculation (AM-BM) is performed by the arithmetic and logic unit 35, and the result is stored in the register SM (S17).

The calculation (SP-SM) [difference between the value of the register SP and the value of the register SM] is performed, the result is stored in the register S (S18), a ratio W/S of the value (real offtrack amount) of the register S to the offset amount W is found, and this value is used as a conversion coefficient (ratio of the offtrack to the real offtrack amount) (S19).

The conversion coefficient G (gain) thus obtained is stored in the 3EEPROM 38 (S20).

Description of an offtrack compensation processing—see FIG. 15.

In FIG. 15, symbols AR, BR, SS and OT denote registers in the work register 34 that is shown in FIG. 11. The process numbers of FIG. 15 are given in parentheses.

This processing, first, seeks a cylinder in which the positioning patterns are written on the data surfaces.

Hereinafter, the servo track center of the servo head is set to be a reference of positioning (S21).

Next, the previously written positioning patterns A and B are read out in this order by the data head 13, and are stored in the registers AR and BR (S22). A difference (AR-BR) between the values of the registers AR and BR is found by calculation, and the result is stored in the register SS (S23).

Thereafter, the arithmetic and logic unit 35 reads the conversion coefficient G that has been stored in the EEPROM 38, finds a product SS×G of the value in the register SS and the conversion coefficient G followed by calibration, uses this value as an offtrack amount (offtrack compensated data), and stores it in the register OT.

Next, a position obtained by subtracting the value (SS×G) of the register OT from a target position Cylcmd (instruction value) is used as a new target position (Cylcmd←Cylcmd−OT) to control the head positioning operation (S25). The offtrack is thus compensated to position the head.

② Embodiment 2 . . . see FIGS. 16 and 17.

The embodiment 1 has dealt with the method of compensating the offtrack. It is, however, difficult to measure the amount of deviation maintaining zero position error (POS Err=0) at all times while tracking the servo surface center.

Therefore, the amount of head deviation obtained in embodiment ] contains control errors at the time of measurement, often making it difficult to correctly grasp the offtrack amount.

The control errors stem from a variety of factors. Most of them remain as control errors despite they appear in the error detection amounts in the head positioning servo system.

In the embodiment 2, attention is given to this point to further improve the processing of the embodiment 1 and to carry out more correct offtrack compensation.

The embodiment 2 will now be described in detail in conjunction with the drawings. In the embodiment 2, the positioning data write processing is the same as the one shown in FIG. 13 and the training sequence for finding the gain G is the same as that shown in FIGS. 14a, 14b. Therefore, these processings are not described here.

Description of an offtrack compensation processing . . . see FIG. 16.

In FIG. 16, symbols PE, AR, BR, SS, $OT_1$ and $OT_2$ denote registers in the work register 34 of FIG. 11. The process numbers of FIG. 16 are given in parentheses.

First, the control seeks a cylinder in which the positioning patterns are written on the data surfaces. Hereinafter, the servo track center of the servo head is set to be a reference of positioning (S31).

Next, the positioning patterns A and B which have been written onto the data surfaces are read out in this order, and their values are stored in the registers AR and BR.

At the same time, the arithmetic and logic unit 35 receives the position error signal (POS Err) from the head positioning servo control unit 5a and stores the value (POS Err) thereof in the register PE (S32).

The difference (AR−BR) between the values of the registers AR and BR is found by calculation, and is stored in the register SS (S33).

Then, a product (SS×G) of the value of the register SS and the conversion coefficient G read from the EEPROM 38 is found and is stored in the register $OT_1$ (S34).

Next, the difference ($OT_1$−PE) between the values of the registers $OT_1$ and PE is found and is stored in the register $OT_2$ (S35).

After this process is finished, the head positioning servo control unit 5a uses a position obtained by subtracting the value of the register $OT_2$ from the target position Cylcmd as a new target position (Cylcmd←Cylcmd−$OT_2$) to control the head positioning operation.

The offtrack is compensated as described above. This state will now be described with reference to FIG. 17.

FIG. 17, (A) shows the offtrack amount (true value) of the data head 13, and it is presumed that the offtrack amount is as shown.

In this case, the control error (POS Err) develops in the servo system as shown in FIG. 17, (B), and the output signal of the offtrack signal generating circuit 26 in the read/write control unit 3 becomes as shown in FIG. 17, (C).

That is, the offtrack amount becomes equal to true offtrack amount plus control error (POS Err).

Here, if the processing of the embodiment 2 is carried out, there is obtained the offtrack amount from which has been removed the effect of the control error (POS Err) as shown in FIG. 17, (D).

③ Embodiment 3 . . . see FIG. 18.

According to the embodiment 3, many conversion coefficients G are found instead of finding only one conversion coefficient in compliance with the training sequence that is shown inn FIGS. 14a, 14b.

For instance, the output level of the pattern A and the output level of the pattern B shown in FIG. 12b may not often establish a linear relationship relative to the offtrack amount (abscissa).

In such a case, characteristics (A-B) shown in FIG. 12c do not describe a straight line but describe a curve as shown in FIG. 18.

Therefore, the curve is divided into sections which are small enough to be regarded as straight lines (proportional relationship), and conversion coefficients (gains) G are found for each of the sections.

That is, the conversion coefficients $G_1$, $G_2$, $G_3$, $G_4$, —and $G_{-2}$, $G_{-3}$, $G_{-4}$, —are found for every offtrack amount relative to the track center.

The conversion coefficients are found in the same manner as in the processing shown in FIGS. 14a, 14b, i.e., the offset amount is changed for reading the patterns A and B, and the conversion coefficients are found that correspond to the respective offset amounts.

The thus found conversion coefficients are stored as table data in the EEPROM 38, and the offtrack is compensated by using these values.

④ Embodiment 4 . . . see FIGS. 19 to 23b.

This embodiment deals with the case where the number of head positioning patterns is increased in order to detect the offtrack over a wider range.

The head positioning patterns are set, for example, as shown in FIG. 19. In this embodiment, the patterns are constituted by a total of three sets, i.e., a set of patterns C and D, a set of patterns A and B, and a set of patterns E and F.

In FIG. 19, symbol M denotes a range in which the measurement can be taken with the patterns A and B, and symbol N denotes a range in which the measurement can be taken by using the set of patterns A and B, the set of patterns C and D and the set of patterns E and F.

Description of a positioning data write processing . . . see FIG. 20 (process numbers of FIG. 20 are given in parentheses.

The positioning patterns (patterns A to F of FIG. 19) are written onto the data surface 14 by the data head 13 as described below.

First, a cylinder on which the positioning patterns are to be written is sought. Hereinafter, the servo track center of the servo head is regarded to be a reference of positioning (S41).

Then, the pattern C is written being offset by $P_1$ from the track center (S42) and the pattern D is written being offset by ($P_1$−W) from the track center (S43).

Thereafter, the pattern A is written (S44) being offset by W/2 in the same direction as $P_1$ from the track center, and the pattern B is written (S45) being offset by W/2 in the same direction as $P_2$ from the track center.

Next, the pattern E is written being offset by ($P_2$+W) from the track center (S46), and the pattern F is written being offset by $P_2$ from the track center (S47).

Through the above-mentioned processings, the patterns A to F are written as shown in FIG. 19. Here, however, $P_1 \leq 3/2W$, $P_2 \leq 3/2W$.

Description of the training sequence for finding conversion coefficient G . . . see FIGS. 21a to 22.

In FIGS. 21a to 22, symbols XM, YM, SM, SP, XP, YP and S denote registers. Further, the process numbers of FIGS. 21a to 22 are given in parentheses.

In this processing, the patterns (see FIG. 19) written as described above are read and measured to find a conversion coefficient (gain) G. Through the training sequence of this example, however, separate conversion coefficients G are found since there are three sets of patterns (C and D, A and B, E and F).

First, a cylinder in which the positioning patterns are written on the data surface is sought (S51). Then, a conversion coefficient measurement subroutine (processing of FIG. 22 that will be described later) is executed (S53) while setting the servo track center of the servo head to be a reference of positioning (S52).

The conversion coefficient Gx found through this processing is denoted as $G_{AB}$ (conversion coefficient found by measuring the patterns A and B) (S54).

Next, $(P_1-W/2)$ from the servo track of the servo head is set to be a reference of positioning (S55), and the conversion coefficient measurement subroutine processing is executed (S56).

The conversion coefficient Gx found through this processing is denoted as $G_{CD}$ (conversion coefficient found by measuring the patterns C and D) (S57).

Next, a position of $(P_2+W/2)$ from the servo track of the servo head is set as a reference of positioning (S58), and the conversion coefficient measurement subroutine processing is executed (S59).

The conversion coefficient Gx found through this processing is denoted as $G_{EF}$ (conversion coefficient found by measuring the patterns E and F) (S60).

The conversion coefficients $G_{AB}$, $G_{CD}$ and $G_{EF}$ found through the above-mentioned processings are stored in the EEPROM 38.

The conversion coefficient measurement subroutine processing is carried out as shown in FIG. 22.

First, a set of patterns are read out while offsetting by W/2 toward the inner side from the reference position (S61), and are stored in the registers XP and YP (S62).

Then, a difference (XP-YP) is found between the values of the registers XP and YP, and is stored in the register SP (S63).

Next, the set of patterns are read out while offsetting by W/2 toward the outer side from the reference position (S64), and are stored in the registers XM and YM (S65).

A difference (XM-YM) is found between the values of the registers XM and YM, and is stored in the register SM (S66).

Then, a difference (SP-SM) is found between the values of the registers SP and SM, and is stored in the register S (S67), and a ratio W/S of the value of the register S to the core width W of the data head is found and is used as a conversion coefficient $G_X$ (S68).

After the above processing is finished, the procedural returns to the main routine (processing of FIGS. 21a, 21b).

The aforementioned registers are all within the work register 34, and aforementioned calculations are all performed by the arithmetic and logic unit 35 (see FIG. 11).

Description of an offtrack compensation processing . . . see FIGS. 23a and 23b.

In FIGS. 23a, 23b, symbols A, B, C, D, E and F denote values (output levels) of when the patterns of FIG. 19 are read out, and symbols AR, BR, Comp, OT and SS denote registers. Further, the process numbers of FIGS. 23a, 23b are given in parentheses.

According to this processing, the patterns A to F written onto the data surfaces are read and measured (measured for each of the patterns of a set) to find an offtrack amount, and the thus found offtrack amount is calibrated by using a conversion coefficient G read out from the EEPROM 38 and is used as a new offtrack compensated data.

First, the control seeks a cylinder in which the positioning patterns are written on the data surfaces. Then, the servo track center of the servo head is set as a reference of positioning (S71).

Next, values of the patterns A, B, C, D, E and F are read (S72) and are compared (S73 to S78).

In the processings S73 and S74, the levels of the patterns B and C are compared to examine on which side of the sections $S_1$ to $S_7$ that are divided into two in FIG. 19 the data head exists.

In the processings S77 and S75, the levels of the patterns A and F are compared to examine on which side of the sections $S_2$ to $S_8$ that are divided into two in FIG. 19 the data head exists, which is then collated with the result of S73 and S74 to check whether the patterns that are read out are normal or not.

When they are not in agreement, the processing is finished as an error in the servo pattern on the data surface (S86).

In the processing of S78, the pattern that is read out is checked in regard to whether it is normal or not. When it is not in agreement, the processing is finished as an error (S86).

Based on the judgements of S73, S74, S78 and S75, the offtrack amount is detected in the set of patterns A and B (S80).

In the processing of S80, the center position of the set of patterns A and B is written at a position of offset "0" with respect to the servo track center, and no compensation is required for the offtrack values that are found through the processings after S83.

In this case, therefore, Comp=0. Moreover, the values of the patterns A and B are stored in the registers AR and BR, respectively.

Based on the judgements of S73, S74 and S77, the offtrack amount is detected in the set of patterns C and D (S81).

In the processing of S81, the center position of the set of patterns C and D is written at a position offset by $(P_1-W/2)$ relative to the servo track center, and the offtrack value found through the processings of after S83 must be compensated by the amount $(P_1-W/2)$.

In this case, therefore, Comp=$P_1-W/2$. Further, the values of the patterns C and D are stored in the registers AR and BR, respectively.

Based on the judgements of S73, S75 and S76, the offtrack amount is detected in the set of patterns E and F (S82).

In the processing of S82, the center position of the set of patterns E and F is written at a position offset by $(P_2+W/2)$ relative to the servo track center, and the offtrack value found through the processings after S83 must be compensated by the amount $(P_2+W/2)$.

In this case, therefore, Comp=$P_2+W/2$. Moreover, the values of the patterns E and F are stored in the registers AR and BR, respectively.

Next, a difference (AR-BR) is found between the values of the registers AR and BR, and is stored in the register SS (S83). Then, a product SS×G of the value of the register SS and the conversion coefficient (gain) G stored in the EEPROM 38 is found and is stored in the register OT (S84).

Thereafter, the offtrack amount is compensated by using the value of the register "Comp" found through the processings S80, S81 and S82 (OFFTRACK←OT+Comp) (S85).

That is, the value (SS×G) of the register OT to which the value of the register "Comp" is added is used as the compensated offtrack amount.

When a combination is detected that does not exist as a combination of the patterns A, B, C, D, E and F through the above processing, the processing is finished as an error in the data surface servo pattern (S86).

The offtrack amount that is determined as described above is then stored in the offtrack compensated value register 36 (see FIG. 11).

The head positioning servo control unit 5a reads the offtrack compensated data from the offtrack compensated value register 36, and controls the head positioning operation.

Other embodiments

Although the embodiments have been described above, the first aspect of the present invention can further be put into practice in a manner as described below.

(1) The training sequence for finding the conversion coefficient (gain) is carried out, for example, in the following cases:

[a] Carried out while the device is being fabricated or while the device is being adjusted before the shipment.

[b] Carried out when, for example, the combination of the mechanical unit and the control unit is changed at a user's place after the shipment. This processing may be carried out either manually or by automatically detecting a change in the combination of the mechanical unit and the control unit.

The change in the combination can be automatically detected by, for example, reading a sole ID number that is imparted to each of the parts of a maintenance unit (a minimum segment that may be disassembled and repaired after the shipment).

(2) The offtrack compensation processing (processing including calibration of FIGS. 15, 16, 23a and 23b) may be executed in the following cases.

[a] Executed after a predetermined period of time.

[b] Executed after a given period of time.

[c] Executed under the condition of a temperature by setting a temperature sensor at a place where the characteristics undergo a change depending upon the temperature,.

[d] Executed frequently at the start of the device and then less frequently with the lapse of time.

[e] Executed when a rated value is not reached by monitoring the seek error rate.

[f] Executed when a rated value is not reached by monitoring the read/write error rate.

[g] Executed every time an error is detected by the device.

[h] Executed when a switch or the like is manipulated by a man.

(3) In executing the offtrack compensation processing in the embodiment 4 (processing which includes the calibration shown in FIGS. 23a and 23b), the offtrack can be compensated more accurately if use is made of a value that is obtained by compensating the measured offtrack amount by the conversion coefficient G and from which a value of the position control error (position error POS Err) is subtracted as in the processing of FIG. 16.

(4) In the embodiment 4, the number of patterns to be written may be increased and these patterns may be written on the outer sides of the pairs of patterns C, D, A, B, E, F. This makes it possible to detect the offtrack amount over a wider range.

As described above, the first aspect of the present invention exhibits the following advantages:

Unlike the prior art, there is no need for averaging the measured data, and the measurement is taken within reduced periods of time. Moreover, the response time of the unit or apparatus is shortened.

When the offtrack amount of the data head is measured with the servo head as a reference, the measured result of data head deviation includes a deviation of the servo head from the true track center. According to the present aspect which excludes such a position error, however, it is allowed to correctly compensate the offtrack.

An offtrack which occurs in principle can be correctly compensated by utilizing the merits of the servo surface servo system.

Since the offtrack is correctly compensated, the data are not written or read at deviated positions but are written or read out at the data track center at all times.

This makes it possible to greatly decrease the data error caused by offtrack contributing to improving the reliability of the device and improving the yield.

The offtrack condition of the data head can be correctly measured without disassembling the unit or apparatus.

Furthermore, by monitoring the measured offtrack amount, it is allowed to detect mechanical abnormality of the unit or apparatus quickly and at an early stage, and to thereby improve the reliability of the unit or apparatus.

Moreover, maintenance and management costs required for the device can be greatly reduced; i.e., there can be provided a device at a reduced cost.

The servo data are written on both sides of the track center while giving an equal offset amount, and the conversion coefficient G is found without affected by non-linear characteristics that exist near "0". As a result, the offtrack is correctly compensated.

Figure 24:
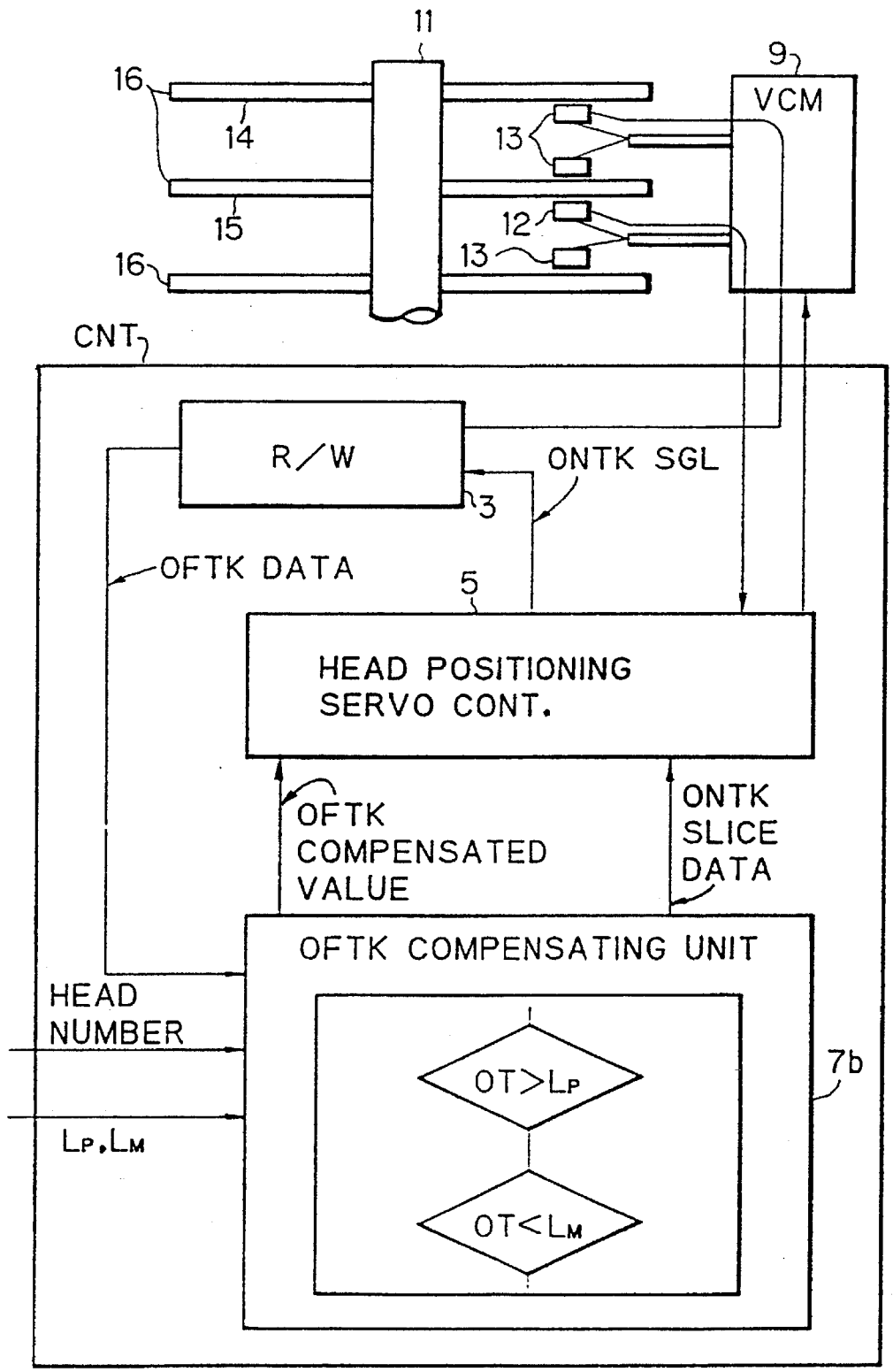
FIG. 24 is a diagram illustrating the principle of the second aspect of the present invention.

FIG. 24 shows the principle of the second aspect of the present invention. In FIG. 24, components identical to those in FIGS. 1 to 7e are assigned the same numerals. OT denotes a register containing an offtrack amount; $L_P$ denotes a positive limit value of an effective range; and $L_M$ denotes a negative limit value of the effective range.

To solve the aforementioned problems in the prior art, the second aspect of the invention is constituted as follows:

(1) In a method of compensating offtrack of a disk unit comprising a plurality of disks 16 any one of which has a servo surface 15 and the others of which have data surfaces 14; a servo head 12 and data heads 13 allocated to said servo surface and said data surfaces, respectively; a positioning mechanism 9 for positioning a servo head and a data head onto an intended track; and a control unit CNT for controlling said positioning mechanism; said control unit reading servo data from a data surface, calculating and updating offtrack compensated data, using said offtrack compensated data and servo information on a servo surface to control head positioning, wherein: an effective range ($L_P$, $L_M$) is set for an offtrack amount detected by said control unit CNT; and when the offtrack amount is within the effective range, an offtrack compensation is performed.

(2) In the constitution (1), when said offtrack amount exceeds said effective range ($L_P$, $L_M$), the offtrack compensation is invalidated and an error is indicated.

(3) In the constitution (1), when said offtrack amount exceeds the effective range ($L_P$, $L_M$), a maximum offtrack amount within said effective range is used to perform an offtrack compensation.

The operation of the second aspect of the present invention based on the above construction will be described with reference to FIG. 24.

An offtrack compensating unit 7b inputs offtrack data from a read/write control unit 3 and data indicating an effective range ($L_P$, $L_M$) of an offtrack amount from a host controller, and generates offtrack compensated data and ontrack slice data.

A head positioning servo control unit 5 inputs a servo signal read by a servo head 12, and offtrack compensated data and ontrack slice data from the offtrack compensating unit 7b, and controls head positioning in accordance with an instruction from the host controller.

Then, the offtrack compensating unit 7b compares the detected offtrack amount (OT value) with the upper and lower limit values $L_P$ and $L_M$ determining an effective range, and judges whether the offtrack amount is within the effective range.

As the result of the determination, if the offtrack amount exceeds the effective range, an error is indicated. Alternatively, the limit value $L_P$ or $L_M$ (maximum value within the effective range) is specified as the offtrack amount, and the offtrack compensation is performed.

This successfully disables data writing or reading in an unstable tracking sate. Therefore, reliability of data or a disk unit is improved.

Preferred embodiments according to the second aspect of the present invention will be described in conjunction with the drawings.

Figure 25:
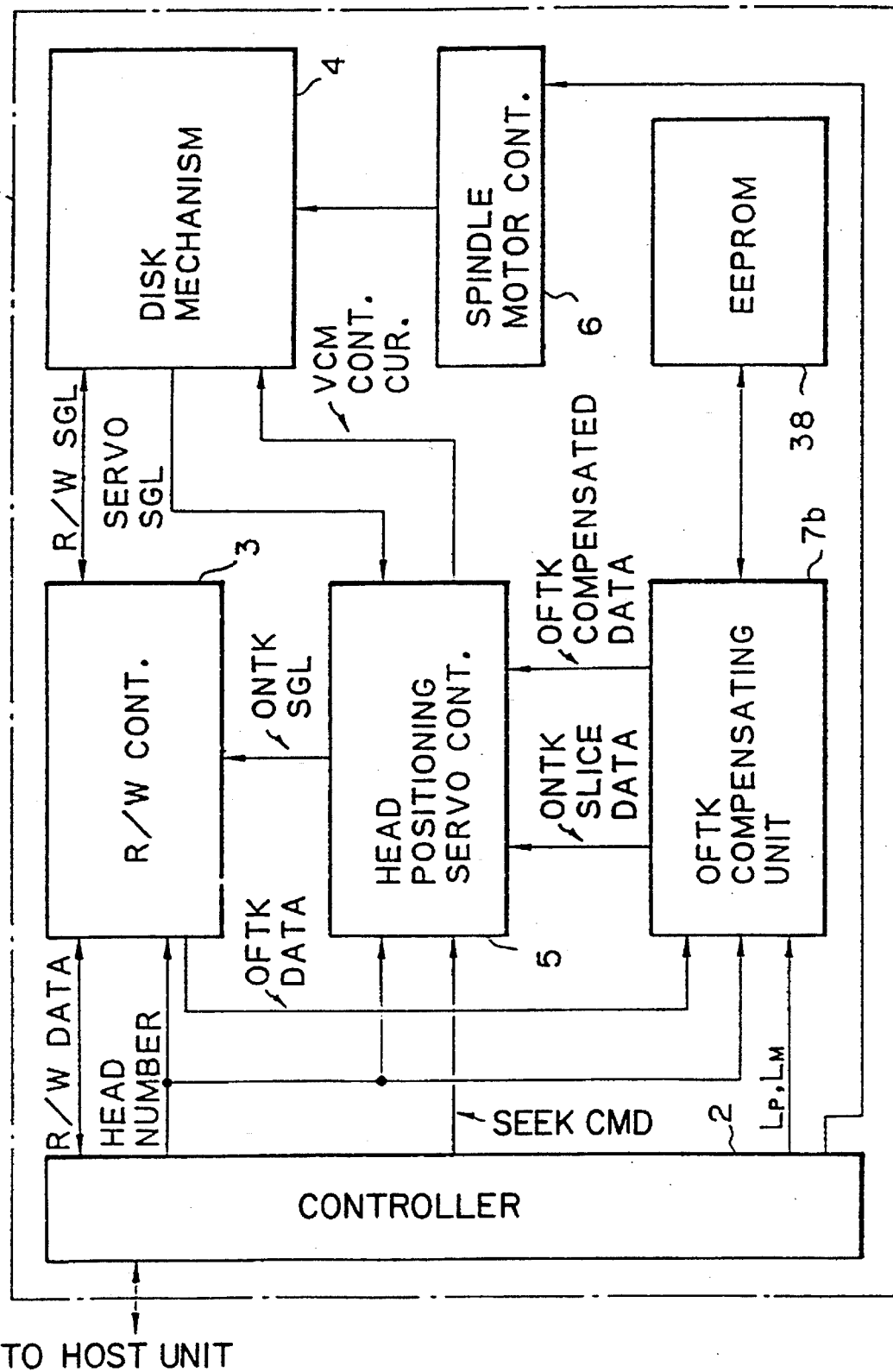
FIG. 25 is a block diagram of a magnetic disk unit.
Figure 26:
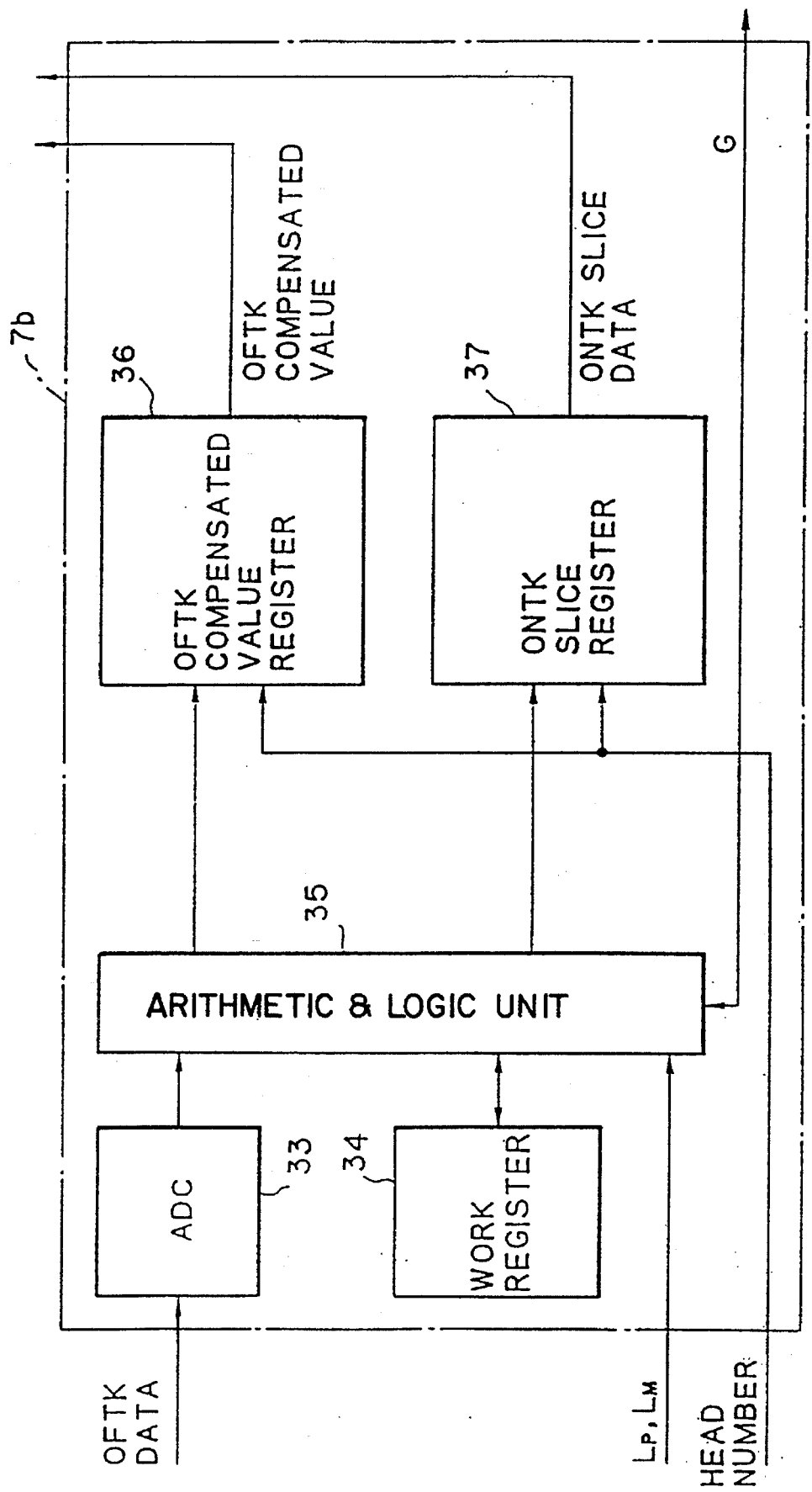
FIG. 26 is a block diagram of an offtrack compensating unit.
Figure 27A:
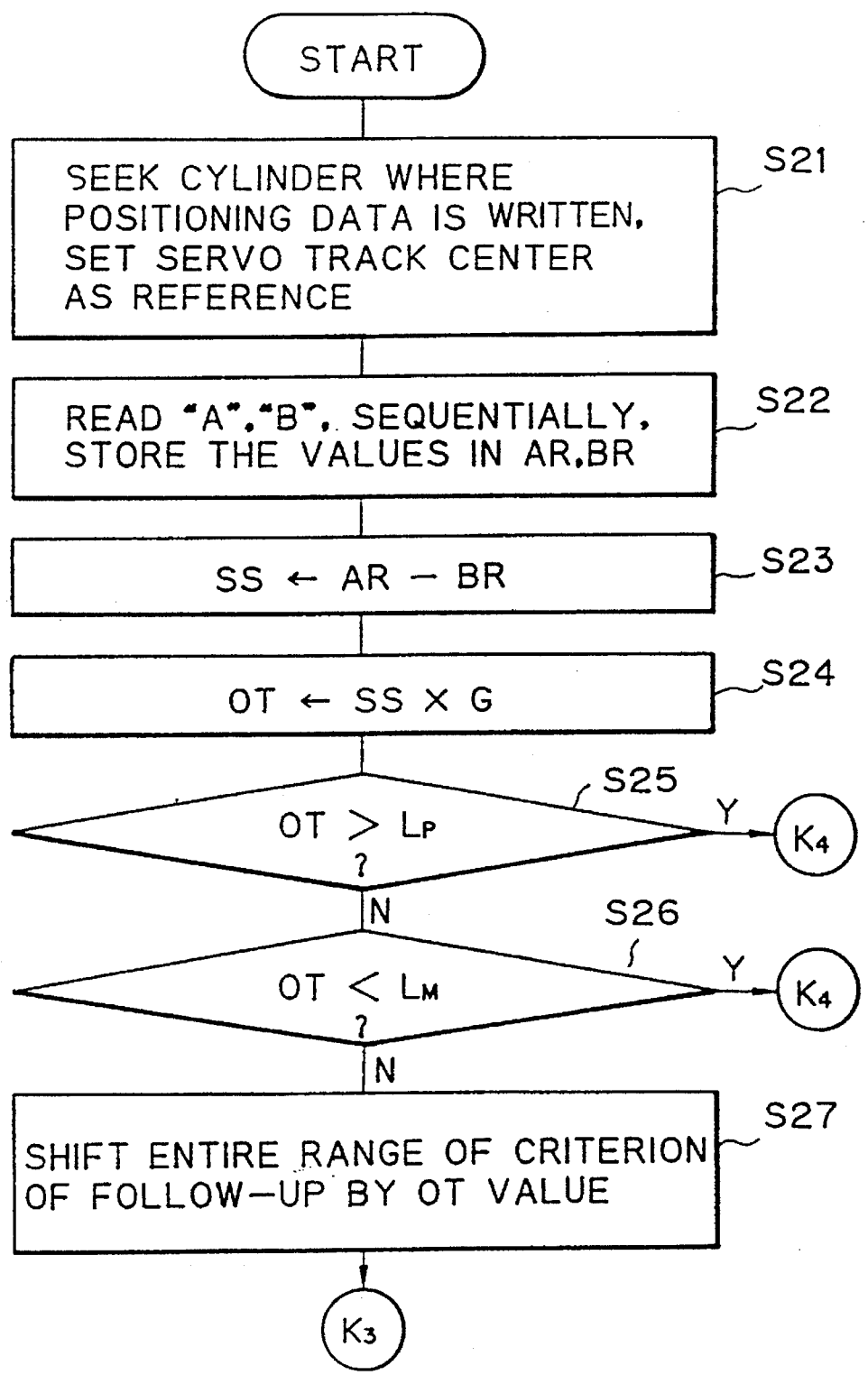
FIG. 27a is a flowchart (part 1) of an offtrack compensation in Embodiment 1.
Figure 27B:
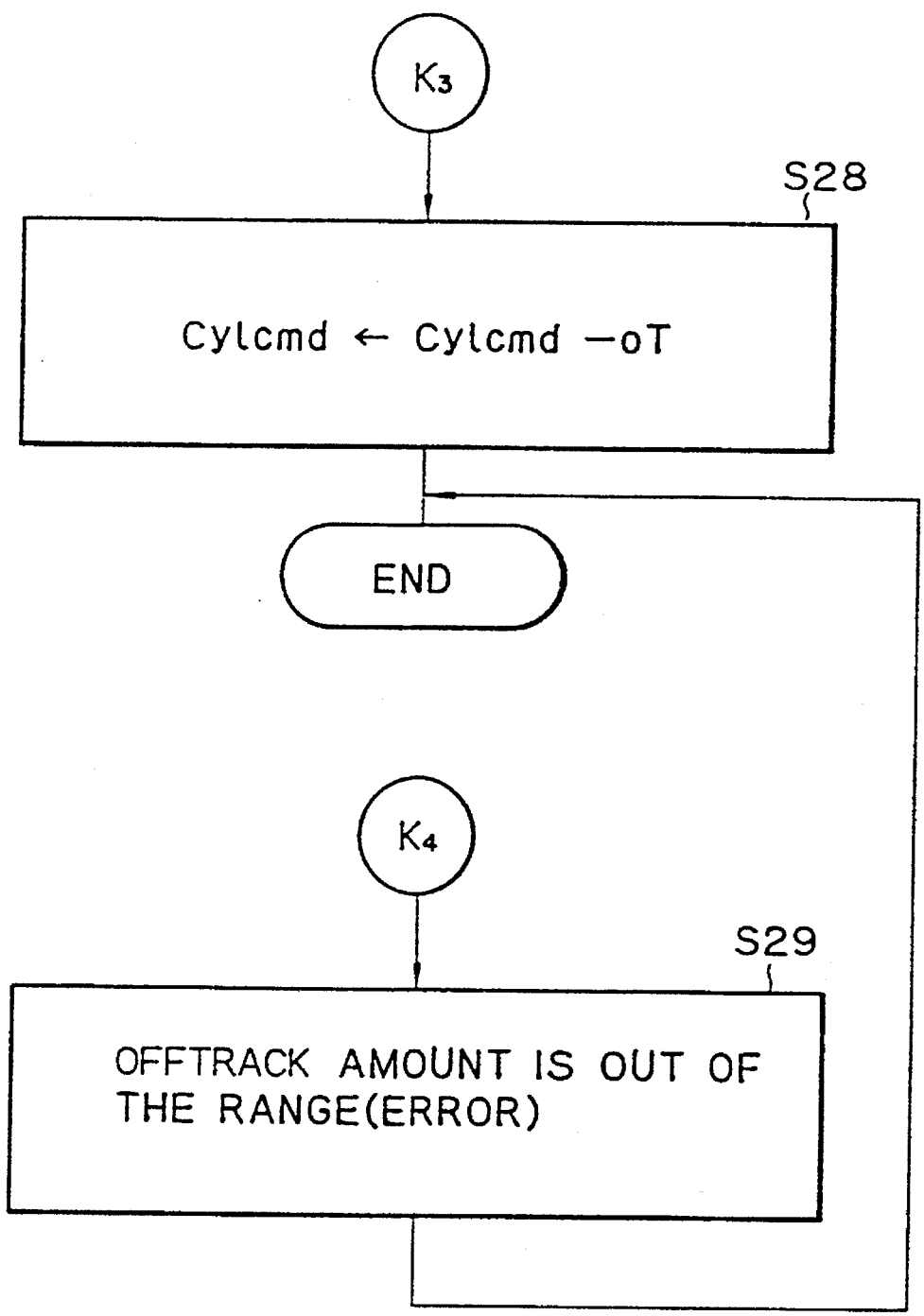
FIG. 27b is a flowchart (part 2) of the offtrack compensation in Embodiment 1.
Figure 28A:
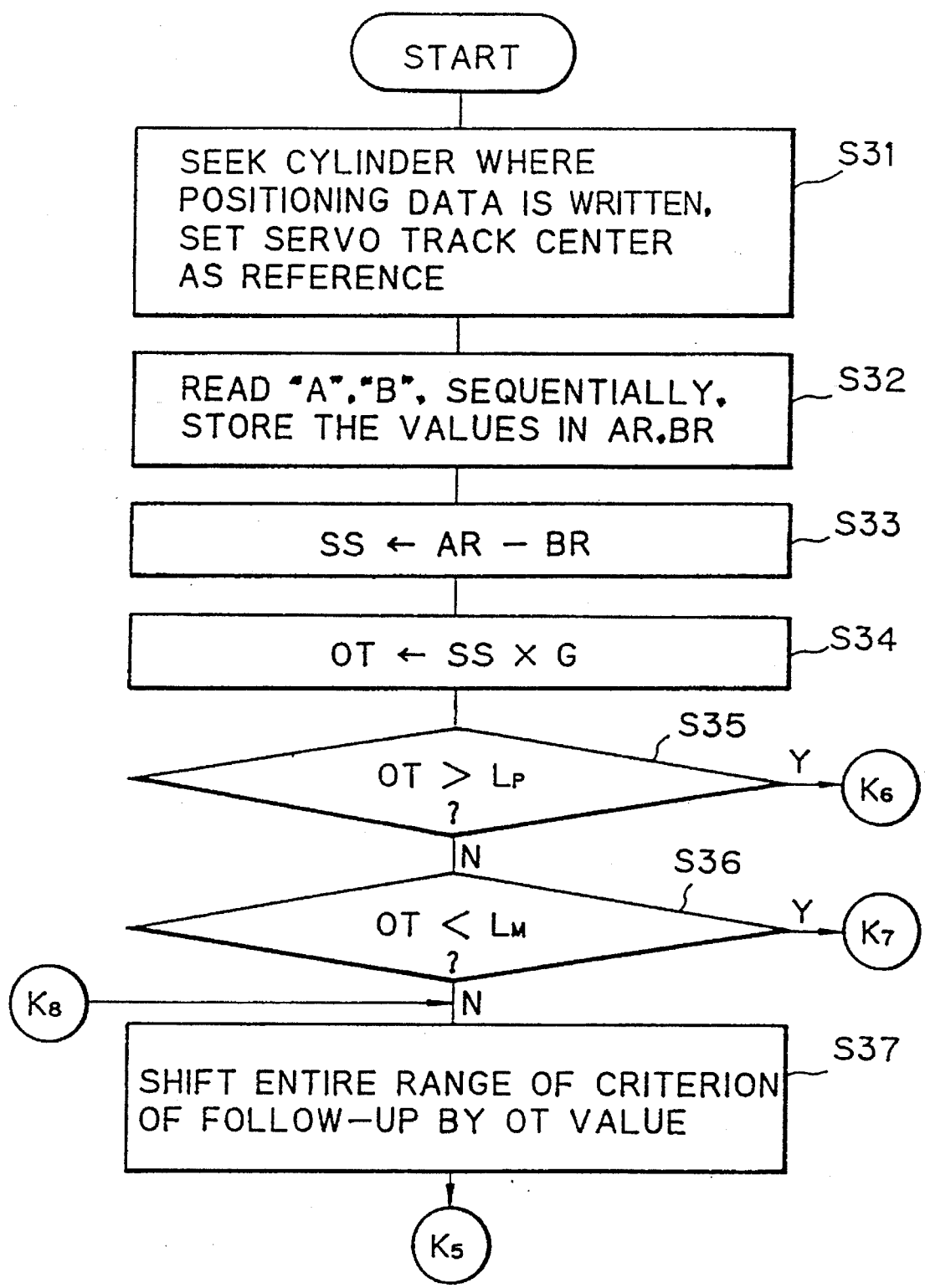
FIGS. 28a to 28d are flowcharts of an offtrack compensation in Embodiment 2.
Figure 28B:
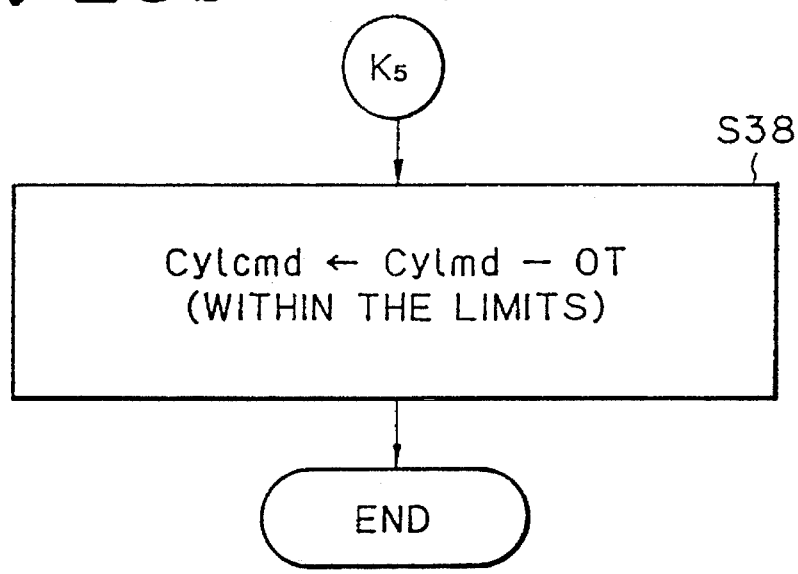
Figure 28C:
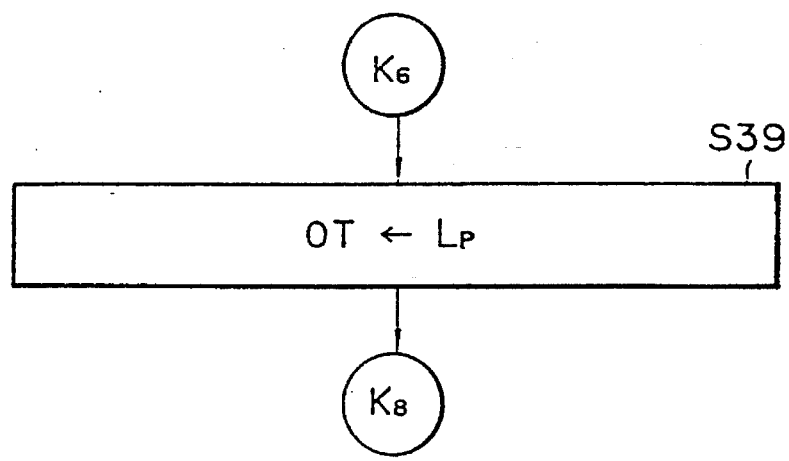
Figure 28D:
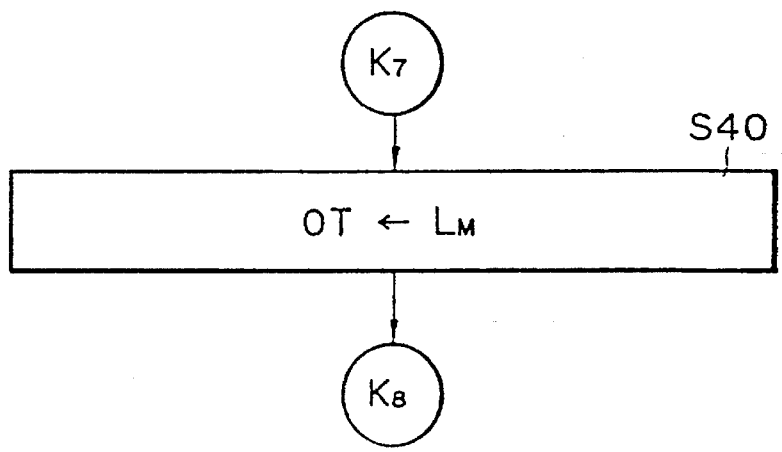
Figure 29A:
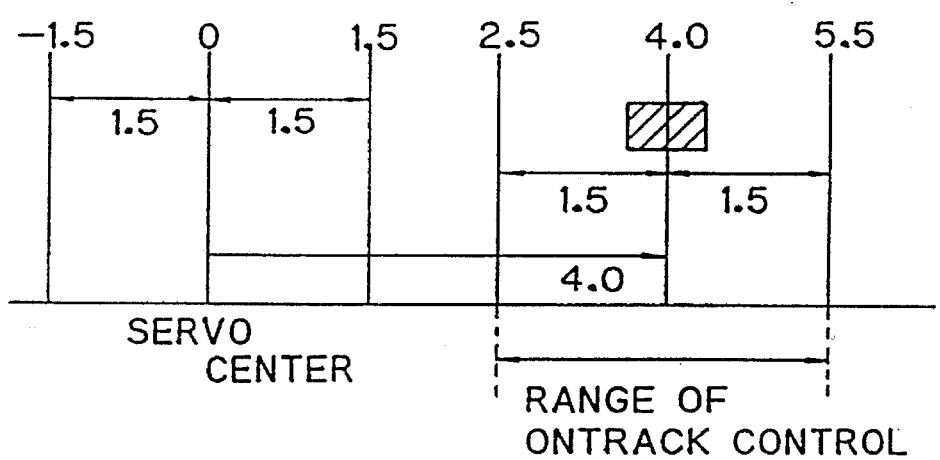
FIGS. 29a and 29b are explanatory diagrams of Embodiment 2.
Figure 29B:
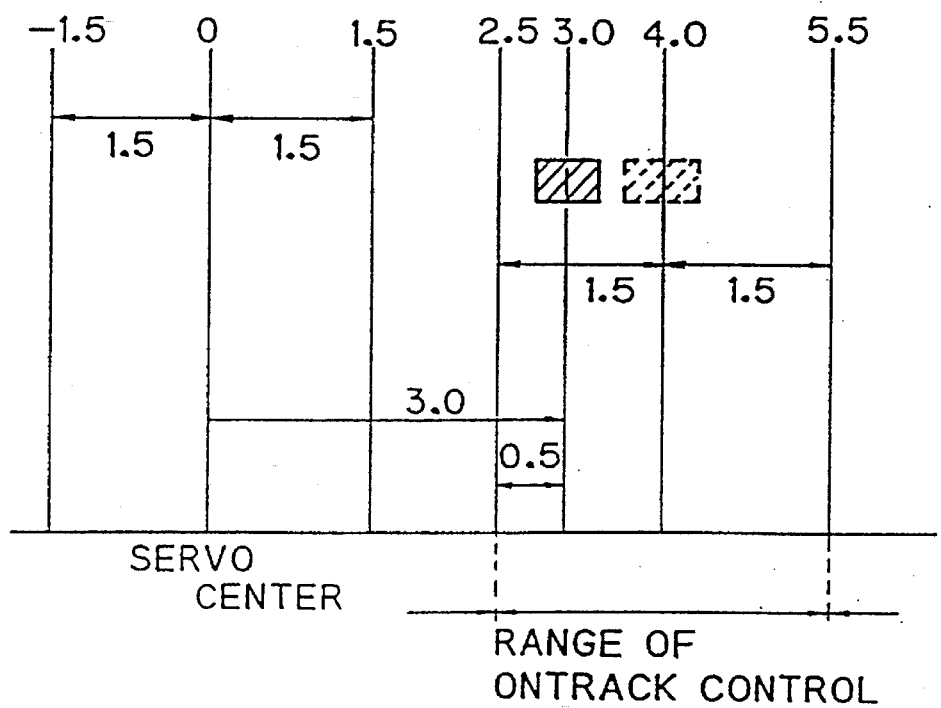

FIGS. 25 to 29b show the preferred embodiments, wherein FIG. 25 is a block diagram of a magnetic disk unit; FIG. 26 is a block diagram of an offtrack compensating unit; FIGS. 27a and 27b are flowcharts of offtrack compensation processing (Embodiment 1); FIGS. 28a to 28d are flowcharts of offtrack compensation processing (Embodiment 2); and FIGS. 29a and 29b are explanatory diagrams of the Embodiment 2.

In FIGS. 25 to 29b, components identical to those in FIGS. 1 to 7e are assigned the same numerals.

(1) Description of a disk unit employed in the embodiments: see FIGS. 25 and 26.

A servo surface servo system magnetic disk unit employed for the embodiments of the second aspect of the present invention are constructed as shown in FIGS. 25 and 26.

A magnetic disk unit 1 comprises a controller 2, a read/write control unit 3, a disk mechanism 4, a head positioning servo control unit 5, a spindle motor control unit 6, an offtrack compensating unit 7b, and an EEPROM 38.

The construction of the magnetic disk unit 1 is the same as those of the aforesaid prior art, except that the EEPROM 38 is added thereto and that limit value data ($L_P$ and $L_M$) are sent from the host controller 2 to the offtrack compensating unit 7b.

In this construction, the EEPROM 38 serves as a memory for storing a conversion coefficient G calculated by performing a training sequence (described later).

The offtrack compensating unit 7b is made up of an analog/digital converter (ADC) 33, a work register 34, an arithmetic and logic unit 35, an offtrack compensated value register 36, and an ontrack slice register 37.

In the offtrack compensating unit 7b, the arithmetic and logic unit 35 performs computations using data of limit values $L_P$ and $L_M$ received from the host controller 2. The arithmetic and logic unit 35 can input or output the conversion coefficient G to or from the EEPROM 38. The other components are the same as those of the aforesaid prior art.

(2) Description of an offtrack compensating method: see FIGS. 12a to 12c, 13, 14a, 14b, and 27a to 29b.

In this embodiment, a positioning pattern is written as servo data on a data surface of a magnetic disk. The pattern is read and measured by performing a training sequence. Thereby, a conversion coefficient is calculated and stored in the EEPROM 38.

Thereafter, when an offtrack compensation is executed, the positioning pattern is read to measure an offtrack amount. The offtrack amount is calibrated using the conversion coefficient read from the EEPROM 38. Then, the calibrated value is used as a detected offtrack amount.

Next, the details will be described in conjunction with the drawings.

1 Embodiment: see FIGS. 12a to 12c, 13, 14a, 14b, 27a and 27b.

In this embodiment, when an offtrack amount exceeds limit values, an error is indicated.

Note, as for FIGS. 12a to 12c, 13, 14a and 14b, the respective explanations have been previously given and thus the description is omitted.

Description ontrack compensation: see FIGS. 27a, 27b (step numbers in FIGS. 27a, 27b are given in parentheses).

In this processing, the patterns A and B written on a data surface during the above processing are read to measure an offtrack amount. The offtrack amount is calibrated using the conversion coefficient G present in the EEPROM 38. The calibrated offtrack amount is used as a detected offtrack amount. It is judged whether the detected offtrack amount is within an effective range. Then, an offtrack compensation is executed.

First, a cylinder on a data surface on which positioning data (patterns A and B) are written is sought. The center of a servo track accessed by a servo head is regarded as a reference of positioning (S21).

Then, the patterns A and B are read in that order, and the values are stored in registers AR and BR. Next, a difference between the values put in the registers AR and BR (AR-BR) is calculated and stored in a register SS (S23).

Thereafter, the conversion coefficient G is read from the EEPROM 38. A product of the value of the register SS by G (SS×G) is calculated to calibrate an offtrack amount. Then, the calibrated offtrack amount is stored in a register OT (S24).

After the above processing is completed, the arithmetic and logic unit 35 in FIG. 26 compares a value of a register OL (register in the work register 34) with the data of limit values $L_P$ (positive limit value of an offtrack amount) and $L_M$ (negative limit value of an offtrack amount), which are received from the host controller 2.

As a result of the comparison, if it is found (S25 and S26) that the value of the register OT (offtrack amount) exceeds the limit values $L_P$ and $L_M$, the offtrack amount is judged to lie out of the range. Consequently, an error is indicated (S29).

However, if the value of the register OT is within the range of the limit values $L_P$ and $L_M$, the entire range of a follow-up criterion is shifted by the value of the register OT (S27). A position obtained by subtracting the offtrack amount from a target position Cylcmd (instructed value) is specified as a new target position. Based on the new target position, positioning the head is controlled (S28).

2 Embodiment 2: see FIGS. 28a to 28d.

In this embodiment, when an offtrack amount exceeds a limit value, the offtrack amount is compensated for to a maximum extent within an effective range (even if an offtrack amount exceeds a limit value, an error is not indicated).

Even in this embodiment, the processing of FIGS. 13, 14a and 14b is performed.

Description of offtrack compensation: see FIGS. 28a to 28d (step numbers in FIGS. 28a to 28d are given in parentheses).

In this processing, first, a cylinder on a data surface on which positioning data (patterns A and B) are written is sought. The center of a servo track accessed by a servo head is regarded as a reference of positioning (S31).

Then, the patterns A and B are read in that order, and the values are stored in the registers AR and BR (S32).

Next, a difference between the values put in the registers AR and BR (AR-BR) is calculated and stored in the register SS (S33).

Thereafter, the conversion coefficient G present in the EEPROM 38 is read. A product of the value of the register SS by the value G (SS×G) is calculated for calibration. Then, the product is stored in the register OT (S34).

Next, the value of the register OT is compared with the limit values $L_P$ and $L_M$ received from the host controller 2.

As a result of the comparison, if it is found (S35) that the value of the register OT exceeds the position limit value $L_P$ of an offtrack amount (OT>$L_P$), the value of the register OT is specified as the limit value $L_P$ (S39).

If it is found (S36) that the value of the register OT is smaller than the negative limit value $L_M$ of an offtrack amount (OT<$T_M$), the value of the register OT is specified as the limit value $L_M$ (S40).

If the value of the register OT is within the range of the limit values ($L_M$<OT<$L_M$), the value of the register OT is used as it is.

Next, the offtrack amount determined by the above processing is specified as a new offtrack amount. Then, the entire range of a follow-up criterion is shifted by the offtrack amount (S37).

Then, a position obtained by subtracting the offtrack amount from a target position Cylcmd is specified as a new target position (S38). Based on the new target position, positioning is controlled.

FIGS. 29a and 29b show examples of the positioning with and without the processing of Embodiment 2, respectively.

FIG. 29a shows an example of the positioning in which limit values $L_P$ and $L_M$ are not set, and FIG. 29b shows an example of the positioning in which the limit values $L_P$ and $L_M$ are set (Embodiment 2).

The examples are described on the assumption that a detected (measured) offtrack amount is 4.0 (micron) and an ontrack control factor is ±1.5 (micron).

First, when the limit values $L_P$ and $L_M$ are not applied thereto, the positioning is completed as shown in FIG. 29a. In this case, the center of a data head whose offtrack amount has been compensated for using a compensation amount calculated using the offtrack amount is located 4.0 off the center of a servo track (this center is regarded as a point "0").

Therefore, the range of ontrack control for the data head is 2.5 to 5.5, which is a range of ±1.5 of 4.0.

By contrast, when the processing of Embodiment 2 is performed, the positioning is completed as shown in FIG. 29b. In this case, a maximum range of compensation is 3.0 ($L_P$=3.0).

Although the detected offtrack amount is 4.0, the value is restricted to $L_P$=3.0. Consequently, the center of the data head is located 3.0 off the center of the servo track.

In short, although the detected offtrack amount is originally 4.0, the offtrack amount is actually compensated for by 3.0 due to the restriction of the limit value.

Then, the range of ontrack control is a range of ±1.5 of 4.0; Namely, 2.5 to 5.5 from the center of the servo track. Compared with the example of FIG. 29a, the range of ontrack control is made narrow by 1 on one side.

As described above, when an effective range is set, the larger an offtrack amount gets, the more strictly the range of ontrack control is made.

Other embodiment

The preferred embodiments have been described so far. The second aspect of the present invention can also be implemented in the following modes:

(1) When an offtrack amount is detected, the value has been calibrated using a conversion coefficient G calculated by the processing shown in FIGS. 13, 14a and 14b (See the operations of S24 in FIG. 27a and S34 in FIG. 28a). Such processings, however, may not be executed.

Namely, even an offtrack amount (offtrack data) detected using any method can be employed.

(2) Limit values $L_P$ and $L_M$ specifying an effective range of an offtrack amount can be set to arbitrary values.

As described above, the second aspect of the present invention has the following advantages:

Since a range of offtrack compensation is limited, data writing or reading can be disabled in a state of unstable tracking. This eventually improves reliability of data or a disk unit.

Also, when a detected offtrack amount takes on a value exceeding half a width of a track, there is a high possibility in that the disk unit has a mechanical defect. In this case, however, the event can be detected as an error.

Although the present invention has been disclosed and described by way of several embodiments, it is apparent to those skilled in the art that other embodiments and modifications of the present invention are possible without departing from the spirit or essential features thereof.

We claim:

1. A method of compensating an offtrack in a disk unit having a plurality of disk media each having a servo surface and data surfaces, a servo head and data heads arranged on said servo surface and said data surfaces, respectively, a head positioning mechanism for positioning the servo head and the data heads on desired tracks, and a control unit for controlling said positioning mechanism, wherein said control unit reads servo data from the data surfaces and updates them to find offtrack compensated data, and the head positioning mechanism is controlled by using the offtrack compensated data and servo information on the servo surface, the method comprising the steps of:

setting an effective range with respect to an offtrack amount detected by the control unit; and effecting an offtrack compensation when the offtrack amount is within the effective range, wherein when the offtrack amount departs out of the effective range, the offtrack compensation is invalidated so that offtrack compensation is inhibited and an error is indicated.

2. A method of compensating an offtrack in a disk unit having a plurality of disk media each having a servo surface and data surfaces, a servo head and data heads arranged on said servo surface and said data surfaces, respectively, a head positioning mechanism for positioning the servo head and the data heads on desired tracks, and a control unit for controlling said positioning mechanism, wherein said control unit reads servo data from the data surfaces and updates them to find offtrack compensated data, and the head positioning mechanism is controlled by using the offtrack compensated data and servo information on the servo surface, the method comprising the steps of:

setting an effective range with respect to an offtrack amount detected by the control unit; and effecting an offtrack compensation when the offtrack amount is within the effective range, wherein the effective range is defined between a maximum positive offset and maximum negative offset and when the offtrack amount departs out of the effective range, an offtrack compensation is conducted by offsetting a data head a fixed maximum offtrack amount set by either the maximum positive or negative offset.

3. A method of compensating offtrack in a disk unit according to claim 2, wherein:

said fixed maximum amount is set equal to said maximum positive offset when the offtrack amount departs out of the effective range by exceeding the maximum positive offset; and said fixed maximum amount is set equal to said maximum negative offset when the effective amount departs out of the effective range by exceeding the maximum negative offset.

4. A method of compensating offtrack in a disk unit according to claim 3, wherein said maximum positive offset has a value equal to said maximum negative offset.

* * * * *

UNITED STATES PATENT AND TRADEMARK OFFICE
CERTIFICATE OF CORRECTION

PATENT NO. : 5,521,773                                    Page 1 of 2
DATED       : May 28, 1996
INVENTOR(S) : Suzuki et al.

It is certified that error appears in the above-indentified patent and that said Letters Patent is hereby corrected as shown below:

On the Title Page:

line 22
Under "[57] Abstract" delete "the" and insert --this-- line 25
Under "[57] Abstract" delete "a reliability" and insert -- the reliability--

Column 3, line 27, delete "the"

Column 10, line 19, after "those", insert --components--

Column 13, line 14, delete "] embodiment" and insert --1 embodiment--

Column 14, line 11, delete "inn" and insert --in--

Column 15, line 56, delete "procedural" and insert --procedure--

UNITED STATES PATENT AND TRADEMARK OFFICE
CERTIFICATE OF CORRECTION

PATENT NO. : 5,521,773
DATED : May 28, 1996
INVENTOR(S) : Suzuki et al.

It is certified that error appears in the above-indentified patent and that said Letters Patent is hereby corrected as shown below:

Column 16, line 19, delete "573" and insert --S73--

Column 19, line 23, delete "sate" and insert --state--

Signed and Sealed this

Twenty-third Day of September, 1997

Attest:

BRUCE LEHMAN

Attesting Officer          Commissioner of Patents and Trademarks